US012114209B2

(12) United States Patent
Hosseini et al.

(10) Patent No.: US 12,114,209 B2
(45) Date of Patent: Oct. 8, 2024

(54) TECHNIQUES FOR SIDELINK RESOURCE RESERVATIONS

(71) Applicant: QUALCOMM Incorporated, San Diego, CA (US)

(72) Inventors: Seyedkianoush Hosseini, San Diego, CA (US); Kapil Gulati, Belle Mead, NJ (US); Gabi Sarkis, San Diego, CA (US); Hong Cheng, Basking Ridge, NJ (US); Qing Li, Princeton Junction, NJ (US); Tien Viet Nguyen, Bridgewater, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 234 days.

(21) Appl. No.: 17/175,438

(22) Filed: Feb. 12, 2021

(65) Prior Publication Data

US 2022/0264376 A1    Aug. 18, 2022

(51) Int. Cl.
*H04W 28/26* (2009.01)
*H04W 72/02* (2009.01)
(Continued)

(52) U.S. Cl.
CPC .......... *H04W 28/26* (2013.01); *H04W 72/02* (2013.01); *H04W 72/0446* (2013.01);
(Continued)

(58) Field of Classification Search
CPC . H04W 28/26; H04W 72/02; H04W 72/0406; H04W 72/0446; H04W 72/10;
(Continued)

(56) References Cited

U.S. PATENT DOCUMENTS

| 2022/0312543 A1* | 9/2022 | Wu .................... H04W 76/28 |
| 2023/0189220 A1* | 6/2023 | Liu .................... H04W 72/04 370/329 |

(Continued)

FOREIGN PATENT DOCUMENTS

| WO | WO-2020068991 A1 | 4/2020 |
| WO | WO-2022019707 A1 | 1/2022 |

OTHER PUBLICATIONS

LG Electronics: "Discussion on Resource Allocation for Power Saving", 3GPP Draft, 3GPP TSG RAN WG1 Meeting #104-e, R1-2100517, 3rd Generation Partnership Project (3GPP), Mobile Competence Centre, 650, Route Des Lucioles, F-06921 Sophia-Antipolis Cedex, France, vol. RAN WG1, No. e-Meeting, Jan. 25, 2021 (Year: 2021).*

(Continued)

*Primary Examiner* — Thinh D Tran
(74) *Attorney, Agent, or Firm* — Holland & Hart LLP/Qualcomm

(57) ABSTRACT

Methods, systems, and devices for wireless communications are described. A first user equipment (UE) may transmit, within an active duration of a first sidelink discontinuous reception (DRX) pattern of a second UE, sidelink control information (SCI) indicating a resource reservation for a sidelink resource of the sidelink channel within at least a portion of an inactive duration of the first sidelink DRX pattern. The first UE may then communicate, with the second UE via the sidelink channel, a sidelink message within the sidelink resource indicated in the resource reservation.

30 Claims, 13 Drawing Sheets

(51) Int. Cl.
*H04W 72/0446* (2023.01)
*H04W 72/20* (2023.01)
*H04W 72/56* (2023.01)
*H04W 76/28* (2018.01)

(52) U.S. Cl.
CPC ........... *H04W 72/20* (2023.01); *H04W 72/56* (2023.01); *H04W 76/28* (2018.02)

(58) Field of Classification Search
CPC ..... H04W 76/28; H04W 72/20; H04W 72/56; H04W 52/0245; H04W 88/04; H04W 52/0216; H04W 92/18; H04W 76/14
See application file for complete search history.

(56) References Cited

U.S. PATENT DOCUMENTS

| | | | | |
|---|---|---|---|---|
| 2023/0262607 A1* | 8/2023 | Yang | ................. | H04W 52/0232 370/318 |
| 2023/0345515 A1* | 10/2023 | Selvanesan | ........... | H04W 72/53 |
| 2023/0389045 A1* | 11/2023 | Ko | ......................... | H04W 4/40 |

OTHER PUBLICATIONS

Ko et al., "Method and apparatus for resource selection and inter-UE coordination under SL DRX in NR V2X", U.S. Appl. No. 63/104,498, filed Oct. 22, 2020 (Year: 2020).*
NEC, "Discussion on resource allocation for power saving", 3GPP TSG RAN WG1 #104-e, R1-2100946 filed on Feb. 5, 2021 (Year: 2021).*
International Search Report and Written Opinion—PCT/US2021/062186—ISA/EPO—Mar. 25, 2022.
LG Electronics: "Discussion on Resource Allocation for Power Saving", 3GPP Draft, 3GPP TSG RAN WG1 Meeting #104-e, R1-2100517, 3rd Generation Partnership Project (3GPP), Mobile Competence Centre, 650, Route Des Lucioles, F-06921 Sophia-Antipolis Cedex, France, vol. Ran WG1, No. e-Meeting, Jan. 25, 2021-Feb. 5, 2021 Jan. 19, 2021 (Jan. 19, 2021), XP051971026, pp. 1-20, Retrieved from the Internet: URL: https://ftp.3gpp.org/tsg_ran/WG1_RL1/TSGR1_104-e/Docs/R1-2100517.zip R1-2100517 Discussion on Resource Allocation for Power Saving.docx [retrieved on Jan. 19, 2021] paragraphs [0001]—[02.5].

* cited by examiner

TECHNIQUES FOR SIDELINK RESOURCE RESERVATIONS

FIELD OF TECHNOLOGY

The following relates to wireless communications, including techniques for sidelink resource reservations.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

Some wireless devices, such as UEs, may be configured with discontinuous reception (DRX) patterns including active durations and inactive durations. Such UEs may be configured to transmit/receive wireless communications during the active durations of the DRX pattern, and "sleep" during the inactive durations of the DRX pattern to conserve power.

SUMMARY

The described techniques relate to improved methods, systems, devices, and apparatuses that support techniques for sidelink resource reservations. Generally, the present disclosure supports techniques for reserving sidelink resources within inactive durations of sidelink discontinuous reception (DRX) patterns at a user equipment (UE). In particular, techniques described herein support multiple rules and configurations which may be implemented at a scheduling UE which may reduce or eliminate interference within a sidelink channel in cases where a second UE is scheduled to perform a sidelink transmission during an inactive period of its sidelink DRX pattern. For example, a first UE (e.g., scheduling UE) may receive, determine, or both, a sidelink DRX pattern of a second UE (e.g., scheduled UE). During an active duration of the sidelink DRX pattern, the first UE may transmit control information which schedules a sidelink message between the first and second UEs within an inactive duration of the sidelink DRX pattern, and the UEs may subsequently communicate the sidelink message during the inactive duration.

A method for wireless communication at a first UE is described. The method may include transmitting, to a second UE and within an active duration of a first sidelink DRX pattern of the second UE, sidelink control information (SCI) indicating a resource reservation for a sidelink resource of a sidelink channel within at least a portion of an inactive duration of the first sidelink DRX pattern and communicating, with the second UE via the sidelink channel, a sidelink message within the sidelink resource indicated in the resource reservation.

An apparatus for wireless communication at a first UE is described. The apparatus may include a processor, memory coupled with the processor, and instructions stored in the memory. The instructions may be executable by the processor to cause the apparatus to transmit, to a second UE and within an active duration of a first sidelink DRX pattern of the second UE, SCI indicating a resource reservation for a sidelink resource of a sidelink channel within at least a portion of an inactive duration of the first sidelink DRX pattern and communicate, with the second UE via the sidelink channel, a sidelink message within the sidelink resource indicated in the resource reservation.

Another apparatus for wireless communication at a first UE is described. The apparatus may include means for transmitting, to a second UE and within an active duration of a first sidelink DRX pattern of the second UE, SCI indicating a resource reservation for a sidelink resource of a sidelink channel within at least a portion of an inactive duration of the first sidelink DRX pattern and means for communicating, with the second UE via the sidelink channel, a sidelink message within the sidelink resource indicated in the resource reservation.

A non-transitory computer-readable medium storing code for wireless communication at a first UE is described. The code may include instructions executable by a processor to transmit, to a second UE and within an active duration of a first sidelink DRX pattern of the second UE, SCI indicating a resource reservation for a sidelink resource of a sidelink channel within at least a portion of an inactive duration of the first sidelink DRX pattern and communicate, with the second UE via the sidelink channel, a sidelink message within the sidelink resource indicated in the resource reservation.

In some examples of the method, apparatuses, and non-transitory computer-readable medium described herein, transmitting the SCI may include operations, features, means, or instructions for transmitting the SCI indicating the resource reservation based on a resource availability within the active duration of the first sidelink DRX pattern.

In some examples of the method, apparatuses, and non-transitory computer-readable medium described herein, transmitting the SCI may include operations, features, means, or instructions for transmitting the SCI indicating the resource reservation based on the resource availability failing to satisfy a threshold resource availability.

In some examples of the method, apparatuses, and non-transitory computer-readable medium described herein, transmitting the SCI may include operations, features, means, or instructions for transmitting the SCI indicating the resource reservation based on the resource availability failing to satisfy a second threshold resource availability that may be adjusted relative to a first threshold resource availability.

In some examples of the method, apparatuses, and non-transitory computer-readable medium described herein, transmitting the SCI may include operations, features, means, or instructions for transmitting the SCI indicating the resource reservation based on the resource availability corresponding to a first priority associated with the sidelink message.

Some examples of the method, apparatuses, and non-transitory computer-readable medium described herein may further include operations, features, means, or instructions for receiving, from an additional UE, additional SCI indicating an additional resource reservation for an additional sidelink resource of the sidelink channel within the active duration of the first sidelink DRX pattern, determining a reference signal received power (RSRP) value associated with reception of the additional SCI, and comparing the RSRP value to a RSRP threshold, where determining the resource availability of the sidelink channel within the active duration may be based on the comparison.

In some examples of the method, apparatuses, and non-transitory computer-readable medium described herein, the RSRP threshold may be based on a first priority associated with the sidelink message, an additional priority associated with an additional sidelink message scheduled within the additional sidelink resource, or both.

Some examples of the method, apparatuses, and non-transitory computer-readable medium described herein may further include operations, features, means, or instructions for receiving a feedback message from the second UE in response to the SCI and based on the sidelink resource being positioned within at least the portion of the inactive duration, where communicating the sidelink message may be based on receiving the feedback message.

In some examples of the method, apparatuses, and non-transitory computer-readable medium described herein, receiving the feedback message may include operations, features, means, or instructions for receiving the feedback message via a sidelink feedback channel.

In some examples of the method, apparatuses, and non-transitory computer-readable medium described herein, the first UE may be configured to remain in an active state.

In some examples of the method, apparatuses, and non-transitory computer-readable medium described herein, the resource reservation occurs within an active duration of a second sidelink DRX pattern of the first UE.

In some examples of the method, apparatuses, and non-transitory computer-readable medium described herein, the active duration of the second sidelink DRX pattern may be longer than the active duration of the first sidelink DRX pattern.

In some examples of the method, apparatuses, and non-transitory computer-readable medium described herein, transmitting the SCI may include operations, features, means, or instructions for transmitting the SCI indicating the resource reservation based on determining that a periodic sidelink transmission may be not configured within a resource pool allocated for the sidelink channel.

In some examples of the method, apparatuses, and non-transitory computer-readable medium described herein, an active duration of second DRX pattern of the first UE may be aligned in the time domain with the active duration of the first sidelink DRX pattern.

In some examples of the method, apparatuses, and non-transitory computer-readable medium described herein, the sidelink message includes a periodic sidelink message, an aperiodic sidelink message, or both.

Some examples of the method, apparatuses, and non-transitory computer-readable medium described herein may further include operations, features, means, or instructions for receiving an indication of the first sidelink DRX pattern of the second UE from the second UE, a base station, or both.

A method for wireless communication at a second UE is described. The method may include receiving, from a first UE and within an active duration of a first sidelink DRX pattern of the second UE, SCI indicating a resource reservation for a sidelink resource of a sidelink channel within at least a portion of an inactive duration of the first sidelink DRX pattern and communicating, with the first UE via the sidelink channel, a sidelink message within the sidelink resource indicated in the resource reservation.

An apparatus for wireless communication at a second UE is described. The apparatus may include a processor, memory coupled with the processor, and instructions stored in the memory. The instructions may be executable by the processor to cause the apparatus to receive, from a first UE and within an active duration of a first sidelink DRX pattern of the second UE, SCI indicating a resource reservation for a sidelink resource of a sidelink channel within at least a portion of an inactive duration of the first sidelink DRX pattern and communicate, with the first UE via the sidelink channel, a sidelink message within the sidelink resource indicated in the resource reservation.

Another apparatus for wireless communication at a second UE is described. The apparatus may include means for receiving, from a first UE and within an active duration of a first sidelink DRX pattern of the second UE, SCI indicating a resource reservation for a sidelink resource of a sidelink channel within at least a portion of an inactive duration of the first sidelink DRX pattern and means for communicating, with the first UE via the sidelink channel, a sidelink message within the sidelink resource indicated in the resource reservation.

A non-transitory computer-readable medium storing code for wireless communication at a second UE is described. The code may include instructions executable by a processor to receive, from a first UE and within an active duration of a first sidelink DRX pattern of the second UE, SCI indicating a resource reservation for a sidelink resource of a sidelink channel within at least a portion of an inactive duration of the first sidelink DRX pattern and communicate, with the first UE via the sidelink channel, a sidelink message within the sidelink resource indicated in the resource reservation.

In some examples of the method, apparatuses, and non-transitory computer-readable medium described herein, receiving the SCI may include operations, features, means, or instructions for receiving the SCI indicating the resource reservation based on a resource availability within the active duration of the first sidelink DRX pattern.

In some examples of the method, apparatuses, and non-transitory computer-readable medium described herein, receiving the SCI may include operations, features, means, or instructions for receiving the SCI indicating the resource reservation based on the resource availability failing to satisfy a threshold resource availability.

In some examples of the method, apparatuses, and non-transitory computer-readable medium described herein, receiving the SCI may include operations, features, means, or instructions for receiving the SCI indicating the resource reservation based on the resource availability failing to satisfy a second threshold resource availability that may be adjusted relative to a first threshold resource availability.

In some examples of the method, apparatuses, and non-transitory computer-readable medium described herein, receiving the SCI may include operations, features, means, or instructions for receiving the SCI indicating the resource reservation based on the resource availability corresponding to a first priority associated with the sidelink message.

Some examples of the method, apparatuses, and non-transitory computer-readable medium described herein may further include operations, features, means, or instructions for transmitting a feedback message to the first UE in response to the SCI and based on the sidelink resource being positioned within at least the portion of the inactive duration, where communicating the sidelink message may be based on transmitting the feedback message.

In some examples of the method, apparatuses, and non-transitory computer-readable medium described herein, transmitting the feedback message may include operations, features, means, or instructions for transmitting the feedback message via a sidelink feedback channel.

In some examples of the method, apparatuses, and non-transitory computer-readable medium described herein, the first UE may be configured to remain in an active state.

In some examples of the method, apparatuses, and non-transitory computer-readable medium described herein, the resource reservation occurs within an active duration of a second sidelink DRX pattern of the first UE.

In some examples of the method, apparatuses, and non-transitory computer-readable medium described herein, the active duration of the second sidelink DRX pattern may be longer than the active duration of the first sidelink DRX pattern.

In some examples of the method, apparatuses, and non-transitory computer-readable medium described herein, receiving the SCI may include operations, features, means, or instructions for receiving the SCI indicating the resource reservation based on a resource pool allocated for the sidelink channel not being configured for a periodic sidelink transmission.

Some examples of the method, apparatuses, and non-transitory computer-readable medium described herein may further include operations, features, means, or instructions for initiating an inactivity timer based on receiving the SCI indicating the resource reservation and extending the active duration of the first sidelink DRX pattern based on the inactivity timer, where communicating the sidelink message may be based on extending the active duration of the first sidelink DRX pattern.

DETAILED DESCRIPTION

Figure 1:
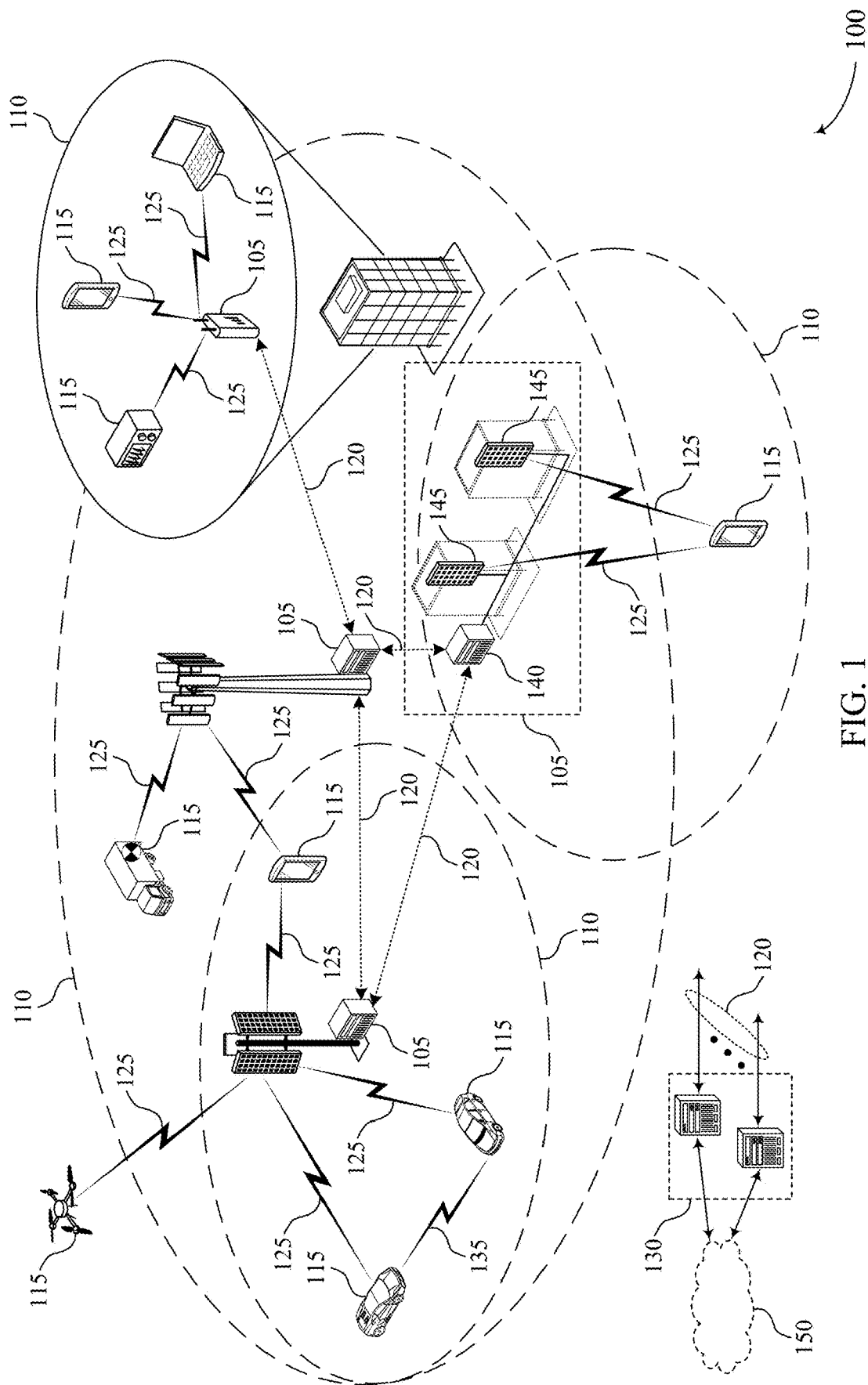
FIG. 1 illustrates an example of a wireless communications system that supports techniques for sidelink resource reservations in accordance with aspects of the present disclosure.

Some wireless devices, such as user equipments (UEs), may be configured with discontinuous reception (DRX) patterns including active durations and inactive durations. Such UEs may be configured to transmit/receive wireless communications during the active durations of the DRX pattern, and "sleep" during the inactive durations of the DRX pattern to conserve power. In cases where a UE receives a control message during an active duration of the DRX pattern, the UE may be able to activate an inactivity timer to delay entering an inactive duration so that the UE may perform a communication (e.g., receive a message) scheduled by the control message. In other words, the inactivity timer may extend an active duration of the DRX pattern. In the context of sidelink communications, two different UEs may be configured with aligned or overlapping DRX patterns so that they can exchange sidelink transmissions during the active durations of the respective DRX patterns. However, the use of inactivity timers to extend active durations in sidelink DRX patterns may result in increased collisions and interference within a sidelink network. For example, if a sidelink transmitting UE initiates transmissions outside of an active duration of a sidelink DRX pattern at a sidelink receiving UE, thereby causing the receiving UE to initiate an inactivity timer to extend an active duration of its sidelink DRX pattern, the scheduled transmission may bleed into active durations of other UEs, which may result in increased interference. Left unmitigated, such interference may inhibit the reliability of sidelink communications.

Accordingly, the present disclosure is directed toward techniques for reserving sidelink resources within inactive durations of sidelink DRX patterns at a UE. In particular, techniques described herein may support multiple rules or configurations which may be implemented at a scheduling UE which may reduce or eliminate interference within a sidelink channel in cases where a second UE is scheduled to perform (e.g., receive) a sidelink transmission during an inactive period of its sidelink DRX pattern.

For example, a first UE (e.g., scheduling UE) may receive or determine a sidelink DRX pattern of a second UE (e.g., scheduled UE). During an active duration of the sidelink DRX pattern, the first UE may transmit control information (e.g., sidelink control information (SCI)) which schedules a sidelink message between the first and second UEs within an inactive duration of the sidelink DRX pattern, and the UEs may subsequently communicate the sidelink message during the inactive duration. In some cases, the first UE may reserve resources within the inactive duration of the sidelink DRX pattern only in cases where the first UE is able to more efficiently monitor for other sidelink transmissions scheduled during the inactive duration, such as cases where the first UE is not configured with a sidelink DRX pattern, or in cases where the first UE has longer active durations of a sidelink DRX pattern.

In other cases, the first UE may perform the sidelink message within the inactive duration only when the second UE provides feedback indicating that it will delay entering the inactive duration to perform the sidelink message. In other words, the second UE may transmit a feedback message (e.g., hybrid automatic repeat request (HARD) acknowledgment (ACK) (HARQ-ACK)) on a physical sidelink feedback channel (PSFCH) upon reception of sidelink control information (SCI) indicating reservations outside of an active duration of the sidelink DRX pattern at the second UE. If the feedback message is received by the first UE, the first UE knows that the second UE has received the indication of the resource reservation outside of the active duration and will stay awake to decode transmissions on the scheduled resources. Otherwise, the first UE does not transmit on the reserved resources outside of the active duration of the sidelink DRX pattern at the second UE even though those resources are reserved and are not preempted by a transmission performed or scheduled by another UE. In other cases, the first UE may reserve resource resources within the inactive duration of the sidelink DRX pattern at the second UE only in cases where there are not sufficient available resources within the active duration of the sidelink DRX pattern.

Aspects of the disclosure are initially described in the context of wireless communications systems. Additional aspects of the disclosure are described in the context of an example resource reservation procedure, an example resource configuration, and an example process flow. Aspects of the disclosure are further illustrated by and described with reference to apparatus diagrams, system diagrams, and flowcharts that relate to techniques for sidelink resource reservations.

FIG. 1 illustrates an example of a wireless communications system 100 that supports techniques for sidelink resource reservations in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

The UEs 115 and the base stations 105 of the wireless communications system 100 may be configured to support techniques for reserving sidelink resources within inactive durations of sidelink DRX patterns at a UE 115. In particular, the wireless communications system 100 may support multiple rules or configurations which may be implemented at a scheduling UE 115 which may reduce or eliminate interference within a sidelink channel in cases where a second UE 115 is scheduled to perform a sidelink transmission during an inactive period of its sidelink DRX pattern.

For example, a first UE 115 (e.g., scheduling UE 115) of the wireless communications system 100 may receive, determine, or both, a sidelink DRX pattern of a second UE 115 (e.g., scheduled UE 115). During an active duration of the sidelink DRX pattern, the first UE may transmit control information (e.g., SCI) which schedules a sidelink message between the first UE 115 and the second UE 115 within an inactive duration of the sidelink DRX pattern, and the UEs 115 may subsequently communicate the sidelink message during the inactive duration.

Continuing with the same example, in some cases, the first UE 115 may reserve resources within the inactive duration of the sidelink DRX pattern only in cases where the first UE 115 is able to more efficiently monitor for other sidelink transmissions scheduled during the inactive duration, such as cases where the first UE 115 is not configured with a sidelink DRX pattern (and is therefore configured to remain in an active state), or in cases where the first UE 115 has longer active durations of a sidelink DRX pattern. In other cases, the first UE 115 may communicate the sidelink message within the inactive duration only when the second UE 115 provides feedback (e.g., acknowledgement (ACK), negative acknowledgement (NACK)) indicating that it will delay entering the inactive duration to perform the sidelink message. In other cases, the first UE 115 may reserve resource resources within the inactive duration of the sidelink DRX pattern at the second UE 115 only in cases where there are not sufficient available resources within the active duration of the sidelink DRX pattern.

Techniques described herein may improve sidelink network coordination to reduce sidelink conflicts while preventing significant increases in signaling overhead. In particular, techniques described herein may enable UEs 115 to schedule sidelink messages within inactive durations of sidelink DRX patterns of other UEs 115, while reducing (or eliminating) conflicts with sidelink messages scheduled via other UEs 115. By enabling sidelink messages to be scheduled within inactive durations of DRX patterns while simultaneously reducing conflicts between sidelink messages, techniques described herein may enable improved sidelink resource utilization and reduce sidelink interference. Moreover, techniques described herein may enable more efficient sidelink DRX patterns to conserve power at UEs 115, while simultaneously reducing a latency of sidelink communications.

Figure 2:
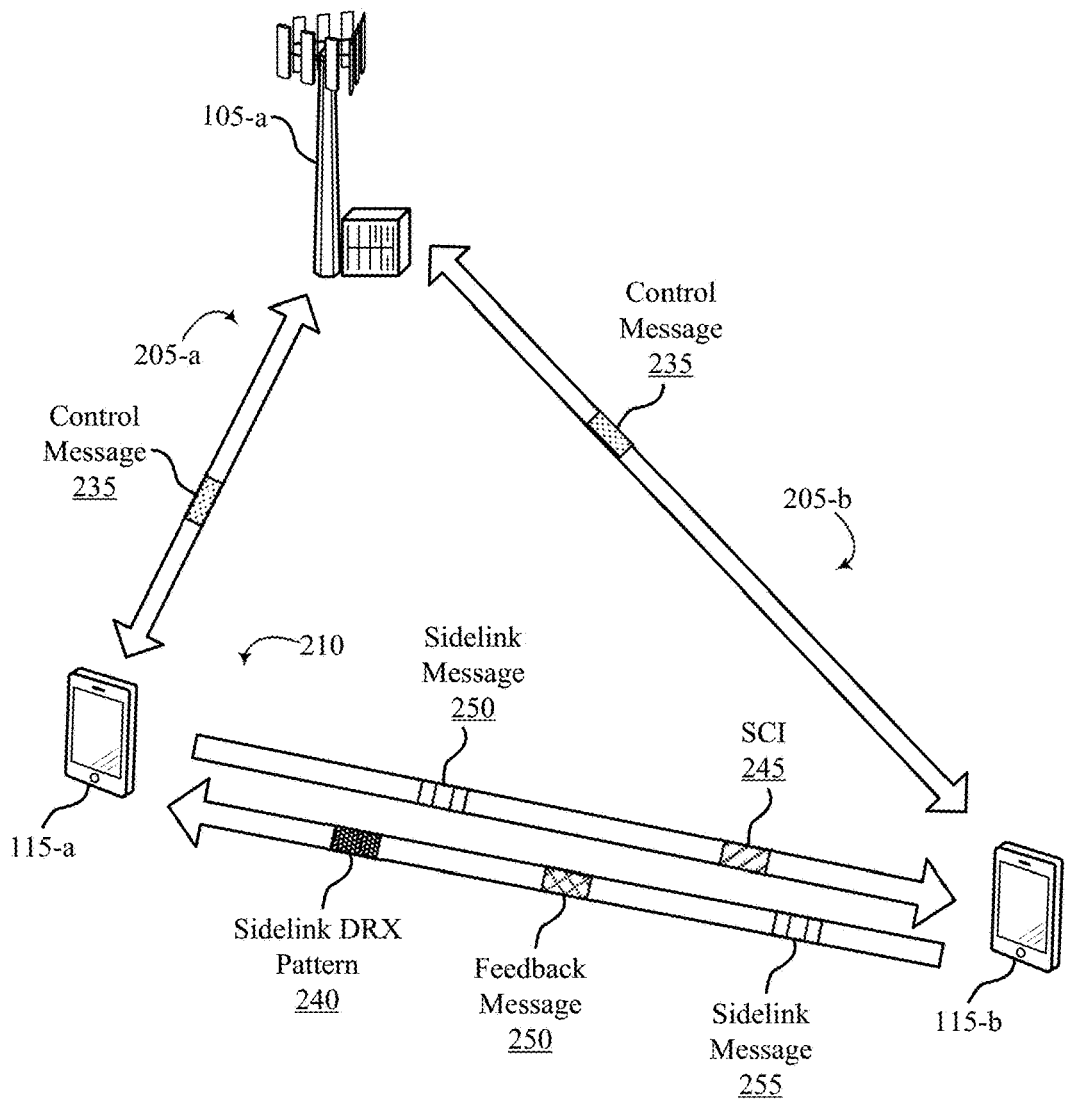
FIG. 2 illustrates an example of a wireless communications system that supports techniques for sidelink resource reservations in accordance with aspects of the present disclosure.
Figure 2:
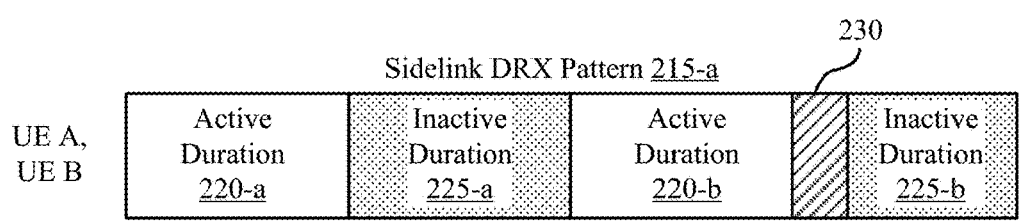
Figure 2:
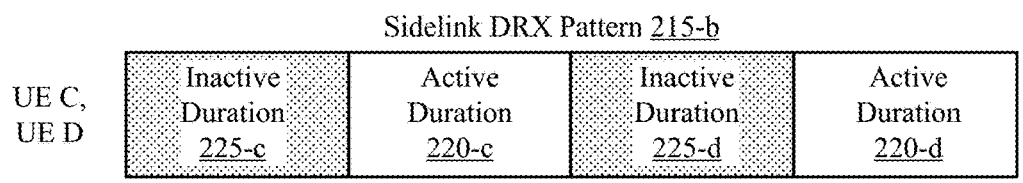

FIG. 2 illustrates an example of a wireless communications system 200 that supports techniques for sidelink resource reservations in accordance with aspects of the present disclosure. In some examples, wireless communications system 200 may implement aspects of wireless communications system 100. Wireless communications system 200 may support techniques for reserving sidelink resources within inactive durations of sidelink DRX patterns at a UE 115.

The wireless communications system 200 may include a base station 105-a, first UE 115-a, a second UE 115-b, and a third UE 115-c, which may be examples of UEs 115, base stations 105, and other wireless devices as described with reference to FIG. 1. In some aspects, one or more of the UEs 115 may communicate with the base station 105-a using a communication link 205, which may be an example of an NR or LTE link between the base station 105-a and the respective UE 115. For example, the first UE 115-a may communicate with the base station 105-a using a communication link 205-a, and the second UE 115-b may communicate with the base station 105-a using a communication link 205-b. In some aspects, communication links 205 between the base station 105-a and the respective UEs 115 (e.g., communication link 205-a, communication link 205-b) may include examples of access links (e.g., Uu links) which may include bi-directional links that enable both uplink and downlink communication. For example, the first UE 115-a may transmit uplink signals, such as uplink control signals or uplink data signals, to the base station 105-a using the communication link 205-a and the base station 105-a may transmit downlink signals, such as downlink control signals or downlink data signals, to the first UE 115-a using the communication link 205-a. In some aspects, the first UE 115-a and the second UE 115-b may communicate with one another using a communication link 210, which may be an example of a sidelink communication link or PC5 link.

In some aspects, the communication link 210 between the respective UEs 115 (e.g., sidelink communication links) may be included within a sidelink network of the wireless communications system 200. The sidelink network (e.g., sidelink network including the communication links 205-b, 205-c) may be configured to operate in a "Mode 1" and/or a "Mode 2." While operating in Mode 1, the sidelink network (e.g., communication link 210) may be managed (e.g., coordinated) by the base station 105-a. In this regard, during Mode 1 operation, the base station 105-a may manage resource allocation over the communication link 210, and may allocate sets of resources within the communication link 210 to the respective UEs 115 via the communication links 205-a, 205-b. In some cases, the base station 105-a may allocate sets of sidelink resources to the respective UEs 115 during Mode 1 operation via RRC signaling, downlink control information (DCI) messages (e.g., DCI 3_0), or both. During Mode 1 operation, the base station 105-a may allocate sidelink resources via dynamic grants, configured grants (e.g., type 1 configured grants, type 2 configured grants), or both. Within Mode 1 operation, a modulation and coding scheme (MCS) used for communications over the communication link 210 (e.g., sidelink communication link) may be left up to the respective UEs 115, within limits which are pre-configured at the UEs 115 and/or signaled by the base station 105-a.

Comparatively, while operating in Mode 2, the sidelink network (e.g., communication link 210) may not be managed (e.g., may not be coordinated) by the base station 105-a. Without coordination or management of the resources of the sidelink network during the Mode 2 operation, the UEs 115 may be configured to monitor the sidelink network (e.g., monitor sidelink communication link 210 and/or other sidelink communication links), and determine sets of sidelink resources which are available for transmission of sidelink messages via the sidelink communication link 210. For example, the first UE 115-*a* may "autonomously" determine sidelink resources which are to be used within the communication link 210 by monitoring the a sidelink network including sidelink communication links, and blindly decoding all physical sidelink shared channels (PSSCHs) within the communication link 210 and sidelink network to identify sidelink resources which have been reserved by other UEs 115. Subsequently, the first UE 115-*a* may report available sidelink resources to the upper layer, and may transmit a sidelink communication (e.g., SCI) which reserves a set of sidelink resources for a sidelink communication to be performed (e.g., transmitted, received) at the first UE 115-*a*. In this regard, Mode 2 operation of the sidelink network including the communication link 210 may follow contention-based access procedures in which the various UEs 115 to "compete" for the use of the sidelink network, including the communication link 210. Reservation of sidelink resources within Mode 1 and/or Mode 2 sidelink operation will be described in further detail with respect to FIG. 3.

As noted previously herein, some UEs 115 may be configured with DRX patterns (e.g., sidelink DRX patterns) including active durations and inactive durations. Such UEs 115 may be configured to transmit/receive wireless communications during the active durations of the DRX pattern, and "sleep" during the inactive durations of the DRX pattern to conserve power. In the context of sidelink communications, two different UEs 115 may be configured with aligned or overlapping sidelink DRX patterns so that they can exchange sidelink transmissions during the active durations of the respective DRX patterns.

For example, a UE A and a UE B may be configured with a sidelink DRX pattern 215-*a* including active durations 220-*a*, 220-*b* and inactive durations 225-*a*, 225-*b*. In this example, UE A and UE B may be configured with the aligned sidelink DRX pattern so that they can communicate with one another during active durations 220-*a*, 220-*b*, and go to sleep during inactive durations 225-*a*, 225-*b*. Thus, UE A and UE B may be configured to wake up and sleep at the same times, and may be unable to receive packets during inactive durations 225-*a* and 225-*b*. Similarly, a UE B and a UE C may be configured with a sidelink DRX pattern 215-*b* including active durations 220-*c*, 220-*d* and inactive durations 225-*c*, 225-*d*, so that they can communicate with one another during active durations 220-*c*, 220-*d*, and go to sleep during inactive durations 225-*c*, 225-*d*. In some aspects, the sidelink DRX patterns 215-*a* and 215-*b* may be associated with a common resource pool. In this regard, sidelink communications performed in accordance with the sidelink DRX pattern 215-*a* and the sidelink DRX pattern 215-*b* may overlap in the frequency domain.

As shown in FIG. 2, the sidelink DRX pattern 215-*a* and the sidelink DRX pattern 215-*b* may include staggered active durations 220 and inactive durations 225 so that sidelink communications between UE A and UE B do not interfere with sidelink communications between UE C and UE D, and vice versa. In particular, active durations 220 of the sidelink DRX pattern 215-*a* may overlap with the inactive durations 225 of the sidelink DRX pattern 215-*b* in the time domain, and vice versa. In other words, sidelink communications performed between UE A and UE B during active duration 220-*a* will not cause interference at UE C and UE D because UE C and UE D are not configured to receive communications during the inactive duration 225-*c*.

In some cases, UEs 115 (e.g., first UE 115-*a*, second UE 115-*b*) may be configured with inactivity timers which may be used to extend an active duration 220 of a sidelink DRX pattern 215. In other words, an inactivity timer may extend an active duration 220 and delay a UE 115 from entering an inactive duration 225 of a DRX pattern (e.g., sidelink DRX pattern 215). For example, referring to the sidelink DRX pattern 215-*a*, UE B may receive a control message (e.g., SCI) during active duration 220-*b* of the sidelink DRX pattern 215, where the control message schedules a sidelink message at UE B. In this example, UE B may be able to activate an inactivity timer to delay entering the inactive duration 225-*b* so that the UE B may perform the sidelink message scheduled by the control message. In other words, the inactivity timer may extend the active duration 220-*b* by a time duration 230. Thus, the SCI received during the active duration 220-*b* may effectively reserve sidelink resources which are outside of the active durations 220 of the sidelink DRX pattern 215-*a*.

However, the use of inactivity timers to extend active durations 220 in sidelink DRX patterns 215 may result in increased collisions and interference within a sidelink network. For example, continuing with the example above, UE B may initiate the inactivity timer to extend the active duration 220-*b* of the sidelink DRX pattern 215-*b* by a time duration 230 to perform a scheduled transmission. In this example, the extended active duration 220-*b* (e.g., time duration 230) may bleed into the active duration 220-*d* of UE C and UE D in sidelink DRX pattern 215-*b*. As such, sidelink communications performed within time duration 230 may interfere with communications between UE C and UE D in active duration 220-*d*. Left unmitigated, such interference may inhibit the reliability of sidelink communications.

Accordingly, the UEs 115 and the base station 105-*a* of the wireless communications system 200 may be configured to support techniques for reserving sidelink resources within inactive durations of sidelink DRX patterns 215 at a UE 115. In particular, the wireless communications system 200 may support multiple rules or configurations which may be implemented at a scheduling UE 115 (e.g., first UE 115-*a*) which may reduce or eliminate interference within a sidelink channel (e.g., communication link 210) in cases where a scheduled UE 115 (e.g., second UE 115-*b*) is scheduled to perform a sidelink transmission during an inactive period of its sidelink DRX pattern.

For example, the base station 105-*a* may transmit a control message 235 indicating a resource pool for a sidelink network (e.g., sidelink channel, communication link 210). In this regard, the control message 235 may indicate a set of resources (e.g., resource pool) which are usable by one or more of the UEs 115 for communicating sidelink messages 255. The base station 105-*a* may transmit the control message 235 to the first UE 115-*a*, the second UE 115-*b*, or both. In some aspects, the control message 235 may indicate what type(s) of sidelink communications are configured for the resource pool. For example, the control message 235 may indicate whether the resource pool is configured for periodic sidelink transmissions, aperiodic sidelink transmissions, or both. In cases where the resource pool is configured for periodic sidelink transmissions, the control message 235 may indicate one or more periodicities which may be used for periodic sidelink transmissions. The control message 235 indicating the resource pool for the sidelink channel(s) may include an RRC message, a DCI message, a synchronization signal block (SSB) message, or any combination thereof.

In some aspects, the first UE 115-a may receive, from the second UE 115-b, a control message indicating a first sidelink DRX pattern 240 (e.g., first sidelink DRX configuration) associated with the second UE 115-b. The first UE 115-a may receive the control message indicating the first sidelink DRX pattern 240 via a sidelink channel between the one or more UEs 115. In some cases, the control message indicating the first sidelink DRX pattern 240 may include an SCI. In some aspects, the second UE 115-b may transmit (and the first UE 115-a may receive) the control message indicating the first sidelink DRX pattern 240 based on receiving the control message indicating the resource pool from the base station 105-a.

The first sidelink DRX pattern 240 at the second UE 115-b may include one or more active durations (e.g., ON durations that consume comparatively more power than OFF durations) and one or more inactive durations (e.g., OFF durations that consume comparatively more power than ON durations). The second UE 115-b may be configured to perform wireless communications during the one or more active durations, and may be configured to sleep, or otherwise transition to a lower power state, during the one or more inactive durations.

In some implementations, the first UE 115-a may be configured to determine/receive the first sidelink DRX pattern 240 of the second UE 115-b without explicit signaling from the second UE 115-b. For example, in some cases, the base station 105-a may indicate the first sidelink DRX pattern 240 to the first UE 115-a, the second UE 115-b, or both (e.g., via control message 235). In additional or alternative cases, the UEs 115 may be pre-configured with information associated with the sidelink DRX patterns 240 of other UEs 115 within the wireless communications system 100.

In some implementations, the first UE 115-a may or may not be configured with a second sidelink DRX pattern. For example, in some cases, the first UE 115-a may not be configured with a sidelink DRX pattern, and may therefore be configured to remain in an active state. In such cases, the first UE 115-a may be able to communicate with the second UE 115-b within at least the active durations of the sidelink DRX pattern at the second UE 115-b. In other cases, the first UE 115-a may be configured with a second sidelink DRX pattern. For instance, in some cases, the first UE 115-a may be configured with a second sidelink DRX pattern including one or more active durations which coincide with, or align with, the one or more active durations of the first sidelink DRX pattern 240 at the second UE 115-b. In such cases, the first UE 115-a and the second UE 115-b may be configured to communicate with one another at least within the portions of the active durations of the respective sidelink DRX patterns which overlap (e.g., align) with one another in the time domain. In some cases, the active durations of the second sidelink DRX pattern at the first UE 115-a may be longer than the active durations of the first sidelink DRX pattern 240 at the second UE 115-b in the time domain.

In some aspects, the first UE 115-a may receive additional SCIs from other UEs 115 of the wireless communications system 200 which reserve sidelink resource(s) of the sidelink channel within the active duration of the first sidelink DRX pattern 240 at the second UE 115-b. In such cases, the first UE 115-a may determine one or more parameters associated with the SCIs received from other UEs 115, including, but not limited to, reference signal received power (RSRP), priority values, and the like. Determining parameters associated with SCIs received from other UEs 115 which schedule sidelink messages within the inactive duration of the first sidelink DRX pattern 240 will be discussed in further detail with respect to FIG. 5.

In some aspects, the first UE 115-a may determine a resource availability (RA) within the active duration of the first sidelink DRX pattern 240 at the second UE 115-b. The first UE 115-a may determine the resource availability for a sidelink message 255 which is to be scheduled between the first UE 115-a and the second UE 115-a. In this regard, the UE 115-a may determine a proportion (e.g., percentage) of sidelink resources within the active duration of the first sidelink DRX pattern 240 which are available for a sidelink message 255 which is to be scheduled between the respective UEs 115-a, 115-b. The first UE 115-a may determine the resource availability for the active duration based on receiving the control message 235 indicating the resource pool, receiving the control message indicating the first sidelink DRX pattern 240, receiving SCIs from other UEs 115 which schedule sidelink messages within the active duration, or any combination thereof.

Upon determining the resource availability for the active duration of the first sidelink DRX pattern 240, the first UE 115-a may compare the determined resource availability (RA) with a threshold resource availability ($RA_{Thresh}$). The first UE 115-a may perform the comparison between the resource availability and the threshold resource availability based on receiving the control message 235 indicating the resource pool, receiving/determining the first sidelink DRX pattern 240, receiving SCIs form other UEs 115 which schedule sidelink messages within the active duration, determining the resource availability, or any combination thereof.

In some aspects, the first UE 115-a may compare the resource availability to the threshold resource availability to determine whether or not it may schedule a sidelink message 255 between the first UE 115-a and the second UE 115-b within the active duration of the first sidelink DRX pattern 240. In particular, the first UE 115-b may determine whether it may schedule a sidelink transmission within the active duration if the resource availability based on whether or not the resource availability (e.g., quantity or percentage of available resources) satisfies the threshold resource availability. In some aspects, the resource availability may satisfy the threshold resource availability if the resource availability is greater than or equal to the threshold resource availability (e.g., threshold satisfied if $RA \geq RA_{Thresh}$). Conversely, the resource availability may fail to satisfy the threshold resource availability if the resource availability is less than the threshold resource availability (e.g., threshold not satisfied if $RA < RA_{Thresh}$).

For example, in some cases, the first UE 115-a may determine that the resource availability satisfies the threshold resource availability (e.g., $RA \geq RA_{Thresh}$). As such, the first UE 115-a may determine that there are sufficient resources within the active duration of the first sidelink DRX pattern 240 at the second UE 115-b to schedule a sidelink message 255 within the active duration. By way of another example, in other cases, the first UE 115-a may determine that the resource availability fails to satisfy the threshold resource availability (e.g., $RA < RA_{Thresh}$). As such, the first UE 115-a may determine that there are insufficient resources within the active duration of the first sidelink DRX pattern 240 at the second UE 115-b to schedule a sidelink message 255 within the active duration. Moreover, by determining that there are insufficient resources within the active duration, the first UE 115-a may be configured to determine that it may schedule a sidelink message 255 with the second UE 115-*b* within the inactive duration of the first sidelink DRX pattern.

In some aspects, it may be preferable to schedule sidelink messages 255 with the second UE 115-*b* within the active duration of the first sidelink DRX pattern 240 at the second UE 115-*b*. As such, the first UE 115-*a* may be configured to selectively adjust the RSRP threshold ($RSRP_{Thresh}$) in an attempt to be able to schedule sidelink messages 255 within the active duration. For example, in cases where the first UE 115-*a* determines that there are insufficient resources within the active duration of the first sidelink DRX pattern 240 to schedule a sidelink message 255 (e.g., $RA<RA_{Thresh}$), the first UE 115-*a* may selectively adjust (e.g., selectively increase) the threshold RSRP to generate a second, or adjusted, threshold RSRP. In this example, the first UE 115-*b* may then compare RSRPs associated with SCIs received from other UEs 115 which schedule sidelink messages within the active duration to the second (e.g., adjusted) threshold RSRP.

In some aspects, the first UE 115-*a* may transmit an SCI 245 to the second UE 115-*b*, where the SCI 245 indicates a resource reservation for a sidelink resource associated with a sidelink message 255. In this regard, the first UE 115-*a* may transmit an SCI 245 which reserves a sidelink resource for a sidelink message 255 between the first UE 115-*a* and the second UE 115-*b*. In some aspects, the first UE 115-*a* may transmit the SCI 245 within the active duration of the first sidelink DRX pattern 240 at the second UE 115-*b*. Moreover, the sidelink resource reserved by the SCI 245 may be positioned within at least a portion of the inactive duration of the first sidelink DRX pattern 240 at the second UE 115-*b*. As such, the SCI 245 may schedule a sidelink message 255 between the first UE 115-*a* and the second UE 115-*b* within at least a portion of the inactive duration.

The sidelink message 255 scheduled by the SCI 245 may include a periodic transmission, an aperiodic transmission, or both. For example, in cases where the resource pool for the sidelink channel is configured to support periodic sidelink transmissions, the sidelink message 255 scheduled by the SCI 245 may include a periodic sidelink message 255.

The first UE 115-*a* may transmit the SCI 245 indicating the resource reservation for the sidelink message 25 based on receiving the control message 235 indicating the resource pool, receiving/determining the first sidelink DRX pattern 240, receiving the SCI 245, determining the resource availability for the active duration, or any combination thereof.

For example, the first UE 115-*a* may transmit the SCI 245 indicating the resource reservation within the inactive duration based on the resource availability within the active duration of the first sidelink DRX pattern 240. For instance, in some cases, the first UE 115-*a* may transmit the SCI 245 indicating the resource reservation within the inactive duration based on the resource availability within the active duration failing to satisfy the threshold resource availability, failing to satisfy a second (e.g., adjusted) threshold resource availability, or both. By way of another example, the first UE 115-*a* may transmit the SCI 245 indicating the resource reservation within the inactive duration based on the resource availability being associated with (e.g., corresponding to) a first priority ($P_r$) associated with the sidelink message 255 scheduled by the SCI 245.

In some cases, the first UE 115-*a* may transmit the SCI 245 reserving the sidelink resource in the inactive duration of the first sidelink DRX pattern 240 based on whether or not periodic sidelink messages 255 are configured within the resource pool allocated for the sidelink channel. For example, the resource pool of the sidelink channel may be configured for periodic sidelink transmissions every K slots (e.g., periodicity of K slots), and the inactive duration of the first sidelink DRX cycle may occur in slot N. In this example, if the first UE 115-*a* was not able to receive communications in any of slots N-iK, where i is an integer, the first UE 115-*a* may not know whether a periodic sidelink transmission was scheduled within slot N of the inactive duration of the first sidelink DRX pattern 240. Accordingly, in some aspects, the first UE 115-*a* may be configured to transmit the SCI 245 reserving the sidelink resource in the inactive duration if the first UE 115-*a* was able to receive communications in any of slots N-iK, where i is an integer and K is a periodicity configured for the resource pool. In such cases, the first UE 115-*a* may determine that no periodic transmissions are scheduled to be performed within the inactive duration.

Moreover, the first UE 115-*a* may be configured to transmit the SCI 245 reserving the sidelink resource in the inactive duration based on determining that the resource pool is not configured for periodic sidelink transmissions. In such cases, there may be no periodic sidelink transmissions, and therefore no possibility of interference with periodic sidelink transmissions by scheduling the sidelink message 255 within the inactive duration. For instance, if the first UE 115-*a* is configured with a second sidelink DRX pattern and the active durations of the first and second sidelink DRX patterns are aligned, the first UE 115-*a* may be able to schedule sidelink messages 255 within the inactive duration of the first sidelink DRX pattern 240 at the second UE 115-*b* if periodic sidelink transmissions are not enabled.

In some aspects, the second UE 115-*b* may initiate an inactivity timer based on receiving the SCI 245 indicating the resource reservation within the inactive duration of the first sidelink DRX period at the second UE 115-*b*. In particular, the second UE 115-*b* may initiate the inactivity timer in order to extend the active duration of the first sidelink DRX pattern 240, and delay entering the inactive duration, in order to perform the sidelink message 255 scheduled by the SCI 245. As such, the second UE 115-*b* may extend the active duration of the first sidelink DRX pattern 240 at the second UE 115-*b* based initiating the inactivity timer.

In some implementations, first UE 115-*a* may receive a feedback message 250 from the second UE 115-*b*. The feedback message 250 may include an ACK, NACK, or both. In some aspects, the first UE 115-*a* may receive the feedback message 250 via a sidelink feedback channel (e.g., PSFCH). In some cases, the second UE 115-*b* may transmit the feedback message 250 in response to the SCI 245, based on initiating the inactivity timer, or both.

In some aspects, the feedback message 250 may indicate that the second UE 115-*b* will extend the active duration of the first sidelink DRX pattern 240 (e.g., delay entering the inactive duration) in order to perform the sidelink message 255 scheduled by the SCI 245. In this regard, the first UE 115-*a* may be configured to determine that the second UE 115-*b* will be awake (e.g., active) so that it may perform the scheduled sidelink message 255 within the inactive duration of the first sidelink DRX pattern 240 at the second UE 115-*b*. In some aspects, the use of feedback messages (or lack thereof) for communicating sidelink messages outside of the active duration may be cast type dependent. For example, the use of feedback messages (or lack thereof) for communicating sidelink messages outside of the active duration may be used for unicast but not groupcast. By way of another example, the use of feedback messages (or lack thereof) for communicating sidelink messages outside of the active duration may be used for groupcast type 2 (where each receiver has to send ACK or NACK) and not used for groupcast type 1 (where only some receivers send NACK and no user send an ACK.)

Subsequently, the first UE 115-a and the second UE 115-b may communicate with one another via the sidelink message 255 (e.g., transmit or receive the sidelink message 255). In this regard, the first UE 115-a and the second UE 115-b may communicate with one another by performing the sidelink message 255 via the sidelink channel within the sidelink resource indicated in the resource reservation of the SCI 245. The UEs 115-a, 115-b may be configured to communicate (e.g., perform) the sidelink message 255 based on transmitting/receiving the SCI 245, initiating the inactivity timer, transmitting/receiving the feedback message 250, or any combination thereof.

For example, the first UE 115-a may transmit the sidelink message 255 to the second UE 115-b. In some cases, the first UE 115-a may be configured to transmit (or refrain from transmitting) the sidelink message 255 based on whether or not it received a feedback message 250 from the second UE 115-b at 550. For example, the first UE 115-a may be configured to transmit the sidelink message 255 at 555 only if it received a feedback message 250 (e.g., ACK/NACK) from the second UE 115-b. By way of another example, the second UE 115-b may transmit the sidelink message 255 to the first UE 115-a.

The second UE 115-b may determine an expiration of the inactivity timer. The second UE 115-b may determine an expiration of the inactivity timer based on initiating the inactivity timer, a duration of the inactivity timer, or both. The duration of the inactivity timer may be signaled to the second UE 115-b (e.g., via RRC signaling), pre-configured at the second UE 115-b, or both. Upon determining the expiration of the inactivity timer and/or transmitting/receiving the sidelink message 225, the second UE 115-b may enter the inactive duration of the first sidelink DRX pattern 240 at the second UE 115-b. For example, the second UE 115-b may enter the inactive duration based on determining the expiration of the inactivity timer. By way of another example, the second UE 115-b may enter the inactive duration after (e.g., based on) transmitting/receiving the sidelink message 225. In this example, the second UE 115-b may be configured to stay awake only until it transmits/ receives the sidelink message 255 on the sidelink resource within the inactive duration of the first sidelink DRX pattern.

Techniques described herein may improve sidelink network coordination to reduce sidelink conflicts while preventing significant increases in signaling overhead. In particular, techniques described herein may enable the first UE 115-a to schedule sidelink messages 255 within inactive durations of the sidelink DRX pattern of the second UE 115-b, while reducing (or eliminating) conflicts with sidelink messages 255 scheduled via other UEs 115 (e.g., third UE 115-e). By enabling sidelink messages 255 to be scheduled within inactive durations of DRX patterns while simultaneously reducing conflicts between sidelink messages 255, techniques described herein may enable improved sidelink resource utilization and reduce sidelink interference. Moreover, techniques described herein may enable more efficient sidelink DRX patterns to conserve power at the UEs 115, while simultaneously reducing a latency of sidelink communications.

Figure 3:
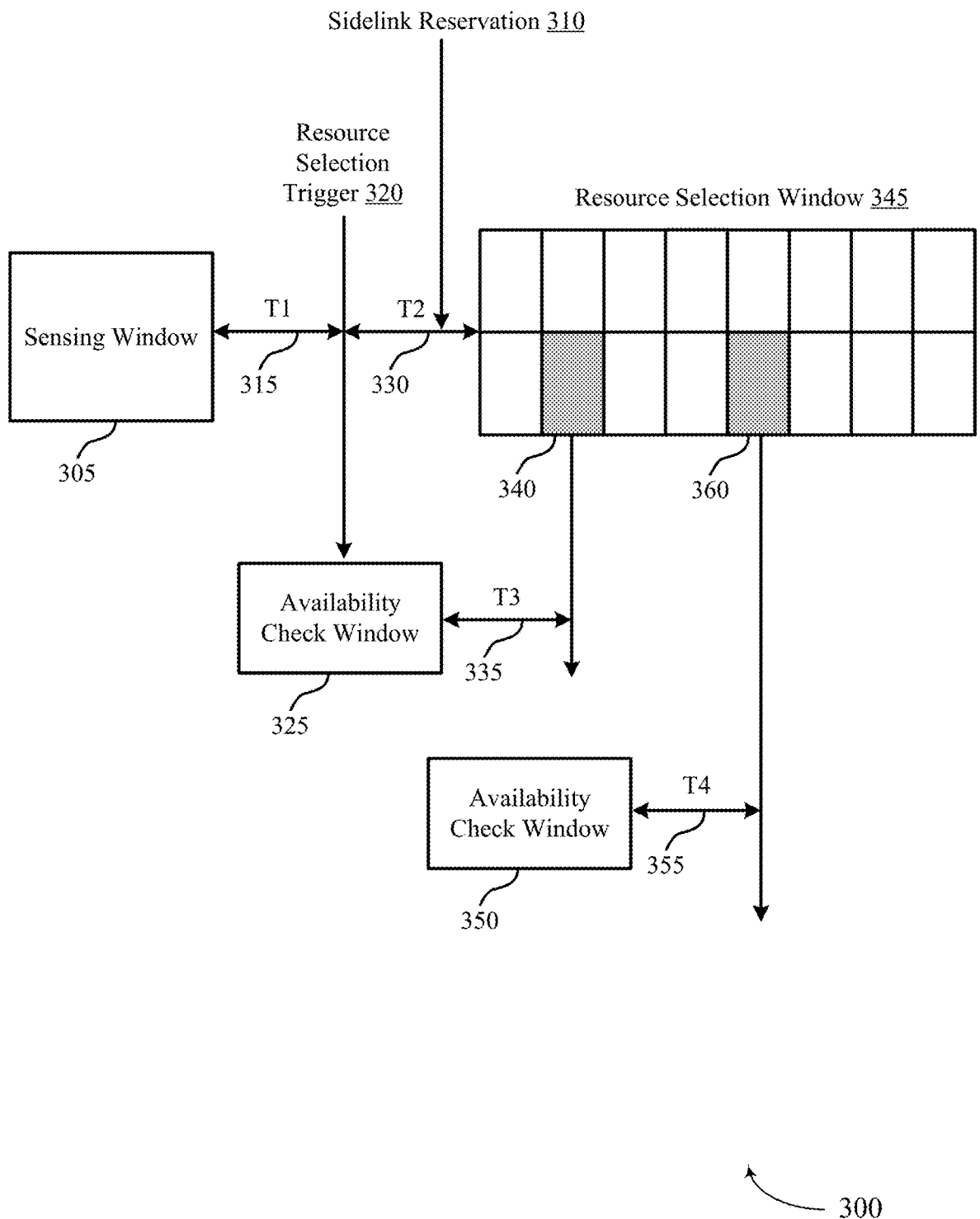
FIG. 3 illustrates an example of a resource reservation procedure that supports techniques for sidelink resource reservations in accordance with aspects of the present disclosure.

FIG. 3 illustrates an example of a resource reservation procedure 300 that supports techniques for sidelink resource reservations in accordance with aspects of the present disclosure. In some examples, the resource reservation procedure 300 may implement, or be implemented by, aspects of wireless communications system 100, wireless communications system 200, or both. In some examples, the resource reservation procedure 300 may be implemented by a base station 105 and one or more UEs 115. The base station 105 and the UE 115 may be examples of a base station 105 and a UE 115, as described with reference to FIGS. 1 and 2.

In some aspects, the resource reservation procedure 300 may illustrate steps performed by UEs 115 and/or base stations 105 to reserve resources of a sidelink communication link during Mode 1 and/or Mode 2 operation of the sidelink communication link. According to one or more aspects of the present disclosure, a first UE 115 may perform sidelink communications with other UEs. In some examples, the first UE 115 may receive control signaling from a base station 105. The control signaling may indicate at least one of a set of resources of a sidelink channel available for sidelink communication with a second UE 115, an indication of a resource allocation mode type for the set of resources, and that the first UE 115 is one of a transmitter or receiver for the set of resources of the sidelink channel.

In some aspects, the first UE 115 may perform a sensing operation during a sensing window 305. The first UE 115 may identify that a first resource 340 is available for sidelink communication based on the sensing operation. Subsequently, the first UE 115 may identify a resource selection trigger 320. The first UE 115 may identify the resource selection trigger 320 after a first time period 315 (T1) has elapsed after expiration of the sensing window 305. Upon receiving the resource selection trigger 320, the first UE 115 may perform an availability check during an availability check window 325. As depicted in the example of FIG. 3, the first UE 115 may communicate the sidelink transmission via the first resource 340 of the sidelink channel. In some examples, the first resource 340 may be included in resource selection window 345. The resource selection window 345 may begin after a second time period 330 (T2) has elapsed since the resource selection trigger 320. Additionally or alternatively, the first resource 340 may be located a third time period 335 (T3) after the availability check window 325.

Following the availability check performed within the availability check window 325, the first UE 115 may receive a sidelink reservation 310 indicating that at least a resource from the set of resources is reserved, or preempted. The first UE 115 may receive the sidelink reservation 310 from the base station 105, another UE 115, or both. In some aspects, because the sidelink reservation 310 is received after the availability check window 325, the first UE 115 may not be configured to consider the sidelink reservation 310 when selecting the first resource 340. The first UE 115 may thus reserve the first resource 340 based on the sidelink reservation 310 being received less than a threshold amount of time prior to the first resource 340.

In some examples, the first UE 115 may receive the sidelink reservation 310 during the second time period 330 (T2), and may process the sidelink reservation 310. The first UE 115 may perform a second availability check during an availability check window 350. As depicted in the example of FIG. 3, the first UE 115 may reserve a second resource 360 and may communicate a sidelink transmission via the second resource 360 of the sidelink channel. In some examples, the second resource 360 may be included in resource selection window 345. The resource selection window 345 may begin after the second time period 330 (T2) has elapsed since the resource selection trigger 320. Additionally or alternatively, the second resource 360 may be located a fourth time period 355 (T4) after the availability check window 350.

As described herein, since the sidelink reservation 510 was received after the availability check window 325, the first UE 115 may not be configured to use the sidelink reservation 310 during the availability check for the first resource 340. However, the sidelink reservation 310 may be used during the availability check window 350 for the second resource 360.

Figure 4:
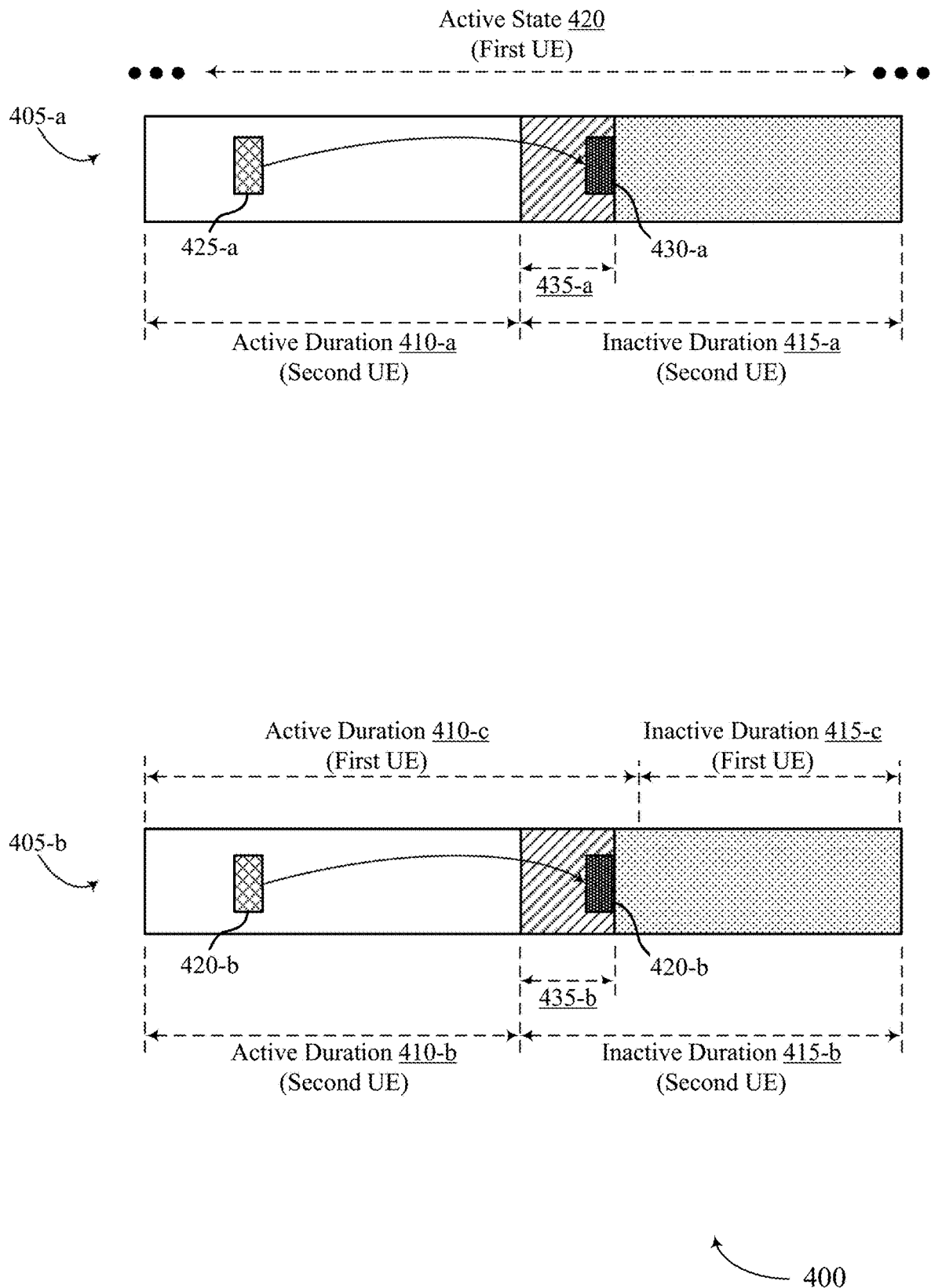
FIG. 4 illustrates an example of a resource configuration that supports techniques for sidelink resource reservations in accordance with aspects of the present disclosure.

FIG. 4 illustrates an example of a resource configuration 400 that supports techniques for sidelink resource reservations in accordance with aspects of the present disclosure. In some examples, the resource configuration 400 may implement, or be implemented by, aspects of wireless communications system 100, wireless communications system 200, the resource reservation procedure 300, or any combination thereof.

In some aspects, the resource configuration 400 illustrates various configurations 405 which may be used to determine whether a first UE 115 may (or may not) reserve resources within an inactive duration of a sidelink DRX pattern at a second UE 115. In particular, according to some implementations, a first UE 115 may reserve sidelink resources within an inactive duration of a second UE 115 based on the sidelink DRX patterns (or lack thereof) configured at each of the respective UEs 115. In some aspects, a first UE 115 may reserve a sidelink resource within an inactive duration of a sidelink DRX pattern at a second UE 115 in cases where the first UE 115 is able to more efficiently monitor for other sidelink messages scheduled during the inactive duration, such as cases where the first UE 115 is not configured with a sidelink DRX pattern (e.g., configuration 405-a), or in cases where the first UE 115 has longer active durations of a sidelink DRX pattern (e.g., configuration 405-b).

For example, as shown in configuration 405-a, a second UE 115 may be configured with a first sidelink DRX pattern, where the first sidelink DRX pattern includes an active duration 410-a and an inactive duration 415-a. As shown in configuration 405-a, the first UE 115 may not be configured with a sidelink DRX pattern, and may therefore be configured to remain in an active state 420. In this regard, due to the fact that the first UE 115 is not configured with a sidelink DRX pattern, the first UE 115 may not be configured with inactive durations 415 during which it is unable to receive communications, or monitor for SCIs from other UEs 115. Accordingly, due to the fact that the first UE 115 is not configured with a sidelink DRX pattern, the first UE 115 may be configured to remain in the active state 420, and may therefore be able to more effectively monitor for other sidelink messages scheduled within the inactive duration 415-b at the second UE 115.

Continuing with reference to configuration 405-a, by remaining in an active state 420, the first UE 115 may be able to determine whether other sidelink messages have been previously scheduled within the inactive duration 415-a, which may reduce (or eliminate) potential scheduling conflicts within the inactive duration. Accordingly, the first UE 115 may be configured to transmit an SCI 425-a indicating a resource reservation for a sidelink resource 430-a within at least a portion of the inactive duration 415-a. In particular, the first UE 115 may transmit the SCI 425-a indicating the sidelink resource 430-a within the inactive duration 415-a based on remaining in the active state 420 (e.g., based on not being configured with a sidelink DRX pattern). Subsequently, the second UE 115 may be configured to activate an inactivity timer to extend the active duration 410-a by a time duration 435-a (e.g., delay entering the inactive duration 415-a by the time duration 435-a). By initiating the inactivity timer, the second UE 115 may be configured to perform a sidelink message within the sidelink resource 430-a.

In additional or alternative cases, the first UE 115 may schedule a sidelink message within an inactive duration 415 of the second UE 115 even when the first UE 115 is configured with a second sidelink DRX pattern. For example, as shown in configuration 405-b, the second UE 115 may be configured with a first sidelink DRX pattern, where the first sidelink DRX pattern includes an active duration 410-a and an inactive duration 415-a. Moreover, as shown in configuration 405-b, the first UE 115 may be configured with a second sidelink DRX pattern including an active duration 410-c and an inactive duration 415-c.

In some cases, as shown in FIG. 4, the active duration 410-a of the second sidelink DRX pattern of the first UE 115 may be longer than the active duration 410-b of the first sidelink DRX pattern of the second UE 115 in the time domain. In such cases, with longer active durations 410, the first UE 115 may be able to more effectively monitor for other sidelink messages scheduled within the inactive duration 415-b of at the second UE 115.

Continuing with reference to configuration 405-b, due to the longer active duration 410-c at the first UE 115, the first UE 115 may be able to determine whether other sidelink messages have been previously scheduled within the inactive duration 415-b, which may reduce (or eliminate) potential scheduling conflicts within the inactive duration. Accordingly, the first UE 115 may be configured to transmit an SCI 425-b indicating a resource reservation for a sidelink resource 430-b within at least a portion of the inactive duration 415-b. In particular, the first UE 115 may transmit the SCI 425-b indicating the sidelink resource 430-a within the inactive duration 415-b based on remaining in the active state 420 (e.g., based on not being configured with a sidelink DRX pattern). Subsequently, the second UE 115 may be configured to activate an inactivity timer to extend the active duration 410-a by a time duration 435-b (e.g., delay entering the inactive duration 415-b by the time duration 435-b). By initiating the inactivity timer, the second UE 115 may be configured to perform a sidelink message within the sidelink resource 430-b.

While the sidelink resources 430-a, 430-b are illustrated in FIG. 4 as being positioned completely within the inactive durations 415-a, 415-b at the second UE 115, this may not always be the case. For example, referring to configuration 405-a, the SCI 425-a may reserve a sidelink resource 430-a which is positioned partially within the active duration 410-a and partially within the inactive duration 415-b in the time domain.

Figure 5:
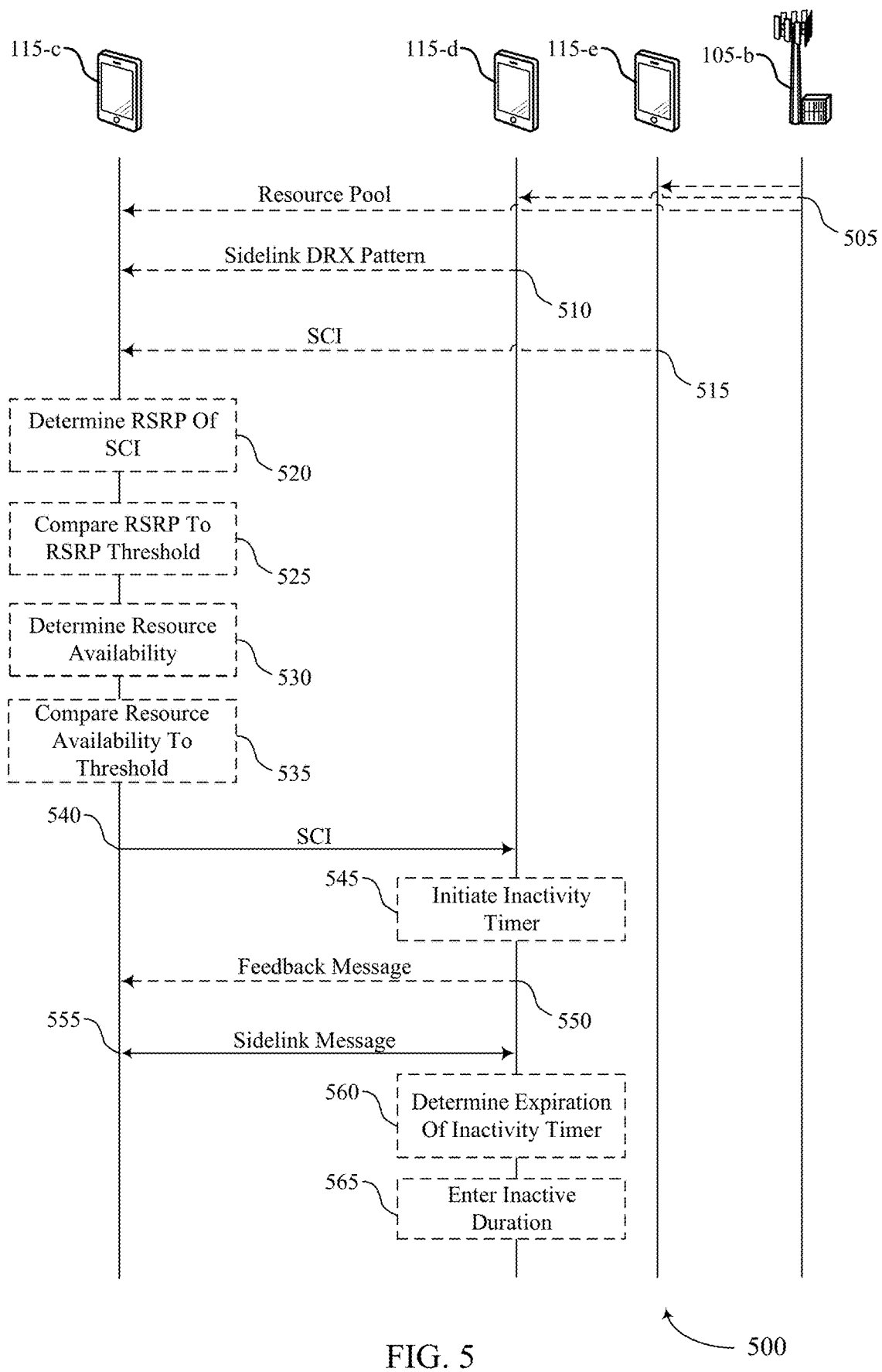
FIG. 5 illustrates an example of a process flow that supports techniques for sidelink resource reservations in accordance with aspects of the present disclosure.

FIG. 5 illustrates an example of a process flow 500 that supports techniques for sidelink resource reservations in accordance with aspects of the present disclosure. In some examples, process flow 500 may implement, or be implemented by, aspects of wireless communications systems 100, wireless communications systems 200, resource reservation procedure 300, resource configuration 400, or any combination thereof. For example, the process flow 500 may illustrate a first UE 115-c receiving a sidelink DRX pattern for a second UE 115-d, transmitting SCI which reserves a sidelink resource in an inactive duration of the sidelink DRX pattern, and communicating a sidelink message with the second UE 115-d within the reserved sidelink resource, as described with reference to FIGS. 1-4.

In some cases, process flow 500 may include a first UE 115-c, a second UE 115-d, a third UE 115-e, and a base station 105-b, which may be examples of corresponding devices as described herein. For example, the first UE 115-c and the second UE 115-d illustrated in FIG. 5 may include examples of the first UE 115-a and the second UE 115-b, respectively, as illustrated in FIG. 2. Similarly, the base station 105-b illustrated in FIG. 5 may include an example of the base station 105-a illustrated in FIG. 2.

In some examples, the operations illustrated in process flow 500 may be performed by hardware (e.g., including circuitry, processing blocks, logic components, and other components), code (e.g., software or firmware) executed by a processor, or any combination thereof. Alternative examples of the following may be implemented, where some steps are performed in a different order than described or are not performed at all. In some cases, steps may include additional features not mentioned below, or further steps may be added.

At 505, the base station 105-b may transmit a control message indicating a resource pool for a sidelink network (e.g., sidelink channel). In this regard, the control message may indicate a set of resources (e.g., resource pool) which are usable by one or more of the UEs 115 for communicating sidelink messages. The base station 105-b may transmit the control message to the first UE 115-c, the second UE 115-d, the third UE 115-e, or any combination thereof. In some aspects, the control message may indicate what type(s) of sidelink communications are configured for the resource pool. For example, the control message may indicate whether the resource pool is configured for periodic sidelink transmissions, aperiodic sidelink transmissions, or both. In cases where the resource pool is configured for periodic sidelink transmissions, the control message may indicate one or more periodicities which may be used for periodic sidelink transmissions. The control message indicating the resource pool for the sidelink channel(s) may include an RRC message, a DCI message, an SSB message, or any combination thereof.

In some cases, the resource pool for the sidelink network may be determined by the UEs 115 without explicit signaling from the base station 105-b. For example, in some cases, the UEs 115 may be pre-configured (e.g., hardcoded) with the resource pool for the sidelink network.

At 510, the first UE 115-c may receive, from the second UE 115-d, a control message indicating a first sidelink DRX pattern (e.g., first sidelink DRX configuration) associated with the second UE 115-d. The first UE 115-c may receive the control message indicating the first sidelink DRX pattern via a sidelink channel between the one or more UEs 115. In some cases, the control message may include an SCI. In some aspects, the second UE 115-d may transmit (and the first UE 115-c may receive) the control message indicating the first sidelink DRX pattern based on receiving the control message indicating the resource pool from the base station 105-b at 505.

In some implementations, the first UE 115-a may be configured to determine/receive the first sidelink DRX pattern 240 of the second UE 115-b without explicit signaling from the second UE 115-b. For example, in some cases, the base station 105-a may indicate the first sidelink DRX pattern 240 to the first UE 115-a, the second UE 115-b, or both (e.g., via control message 235). In additional or alternative cases, the UEs 115 may be pre-configured with information associated with the sidelink DRX patterns 240 of other UEs 115 within the wireless communications system 100. In this regard, sidelink DRX patterns at the respective UEs 115 may be set up, or configured, according to different techniques between a pair/group of UEs 115. The sidelink DRX patterns at the respective UEs 115 may be indicated by the base station 105-b, indicated by one or more of the UEs 115, negotiated between the UEs 115 (e.g., during the PC5 link setup over PC5 RRC), and the like. In some cases, the sidelink DRX patterns at the respective UEs 115 may be application or service type dependent.

The first sidelink DRX pattern at the second UE 115-d may include one or more active durations (e.g., ON durations) and one or more inactive durations (e.g., OFF durations). The second UE 115-d may be configured to perform wireless communications during the one or more active durations, and may be configured to sleep, or otherwise transition to a lower power state, during the one or more inactive durations.

In some implementations, the first UE 115-c may or may not be configured with a second sidelink DRX pattern. For example, in some cases, the first UE 115-c may not be configured with a sidelink DRX pattern, and may therefore be configured to remain in an active state. In such cases, the first UE 115-c may be able to communicate with the second UE 115-d within at least the active durations of the sidelink DRX pattern at the second UE 115-d. In other cases, the first UE 115-c may be configured with a second sidelink DRX pattern. For instance, in some cases, the first UE 115-c may be configured with a second sidelink DRX pattern including one or more active durations which coincide with, or align with, the one or more active durations of the first sidelink DRX pattern at the second UE 115-d. In such cases, the first UE 115-c and the second UE 115-d may be configured to communicate with one another at least within the portions of the active durations of the respective sidelink DRX patterns which overlap (e.g., align) with one another in the time domain. In some cases, the active durations of the second sidelink DRX pattern at the first UE 115-c may be longer than the active durations of the first sidelink DRX pattern at the second UE 115-d in the time domain.

At 515, the first UE 115-c may receive an SCI from the third UE 115-e. The first UE 115-c may receive the SCI via the sidelink channel between the respective UEs 115. The SCI may indicate a resource reservation for a sidelink resource of the sidelink channel within an active duration of the first sidelink DRX pattern at the second UE 115-d. In this regard, the SCI received at 515 may reserve a sidelink resource(s) of the sidelink channel within the active duration of the sidelink DRX pattern at the second UE 115-d. The sidelink resource reserved by the SCI may be for a sidelink message which is to be performed by the third UE 115-e and/or another UE 115 of the wireless communications system. As such, the SCI may indicate a type of sidelink message associated with the reserved sidelink resource, a priority ($P_j$) associated with a sidelink message to be performed within the reserved sidelink resource, and the like. The first UE 115-c may receive the SCI at 515 based on receiving the control message indicating the resource pool at 505, receiving the control message indicating the sidelink DRX pattern at 510, or both.

At 520, the first UE 115-c may determine one or more parameters associated with the SCI received at 515. For example, the first UE 115-c may perform a one or more measurements to determine an RSRP associated with reception of the SCI received at 515. The first UE 115-c may determine the parameters associated with the SCI at 520 based on receiving the control message indicating the resource pool at 505, receiving the control message indicating the sidelink DRX pattern at 510, receiving the SCI at 515, or any combination thereof.

In some cases, the first UE 115-c may determine other parameters associated with the SCI received from the third UE 115-e. For example, the first UE 115-c may determine a priority ($P_j$) associated with a sidelink message which is scheduled to be performed within the sidelink resource reserved by the SCI. In some aspects, the first UE 115-c may determine the priority based on a type of sidelink message which is scheduled via the SCI. As will be noted in further detail herein, the priority ($P_j$) associated with a sidelink message scheduled by the third UE 115-e may be used by the first UE 115-c when scheduling a sidelink transmission between the first UE 115-c and the second UE 115-d.

At 525, the first UE 115-c may compare the determined RSRP associated with the received SCI with an RSRP threshold ($RSRP_{Thresh}$). As such, the first UE 115-c may perform the comparison at 525 based on receiving the SCI at 515, determining an RSRP for the SCI at 520, or both. Moreover, the first UE 115-c may perform the comparison at 525 based on determining that the sidelink resource reserved by the SCI is within the active duration of the first sidelink DRX pattern at the second UE 115-d. Accordingly, the first UE 115-c may perform the comparison at 515 based on receiving the control message indicating the resource pool at 505, receiving the control message indicating the sidelink DRX pattern at 510, or both.

In some aspects, the RSRP threshold may be based on the priority ($P_j$) of the sidelink message scheduled by the SCI received at 515. Additionally or alternatively, the RSRP threshold may be based on a priority ($P_i$) of a sidelink message which is to be performed between the first UE 115-c and the second UE 115-d. In this regard, the RSRP threshold ($RSRP_{Thresh}$) Thresh) may be a function of priorities $P_i$ and $P_j$. In particular, the RSRP threshold may be determined based on a relative comparison of the $P_i$ and $P_j$. In some aspects, the relative value of the RSRP threshold may be based on a level of acceptable interference associated with a sidelink message to be scheduled by the first UE 115-d. A higher RSRP threshold may be associated with higher levels of acceptable interference, whereas a lower RSRP threshold may be associated with lower levels of acceptable interference.

For example, if a sidelink message to be performed at the first UE 115-c has a higher priority than the sidelink message scheduled by the third UE 115-d (e.g., $P_i > P_j$), the RSRP threshold may be higher, indicating that higher levels of interference may be acceptable to enable performance of the higher-priority sidelink message. Comparatively, if a sidelink message to be performed at the first UE 115-c has a lower priority than the sidelink message scheduled by the third UE 115-d (e.g., $P_i < P_j$), the RSRP threshold may be lower, indicating that lower levels of interference may be acceptable to enable performance of the lower-priority sidelink message.

At 530, the first UE 115-c may determine a resource availability (RA) within the active duration of the first sidelink DRX pattern at the second UE 115-d. The first UE 115-c may determine the resource availability for a sidelink message which is to be scheduled between the first UE 115-c and the second UE 115-c. In this regard, the UE 115-c may determine a proportion (e.g., percentage) of sidelink resources within the active duration of the first sidelink DRX pattern which are available for a sidelink message which is to be scheduled between the respective UEs 115-c, 115-d. The first UE 115-c may determine the resource availability at 530 based on receiving the control message indicating the resource pool at 505, receiving the control message indicating the sidelink DRX pattern at 510, receiving the SCI at 515, determining an RSRP for the SCI at 520, performing the comparison at 525, or any combination thereof.

For example, the first UE 115-c may determine the resource availability at 530 based on the comparison performed at 525. In particular, the sidelink resource reserved by the SCI received at 515 may be determined to be available (or not available) based on whether the RSRP of the received SCI satisfies the RSRP threshold. For instance, if the RSRP is greater than or equal to the RSRP threshold ($RSRP \geq RSRP_{Thresh}$), the RSRP value may satisfy the threshold. In this example, due to the fact that the RSRP is greater than or equal to the RSRP threshold, this may indicate a relatively high level of interference which will be attributable to the sidelink message scheduled by the SCI. As such, the first UE 115-c may determine that the sidelink resource reserved by the SCI is not available based on the RSRP satisfying the RSRP threshold. By way of another example, if the RSRP is less than the RSRP threshold ($RSRP < RSRP_{Thresh}$), the RSRP value may fail satisfy the threshold. In this example, due to the fact that the RSRP is less than the RSRP threshold, this may indicate a relatively low level of interference which will be attributable to the sidelink message scheduled by the SCI. As such, the first UE 115-c may determine that the sidelink resource reserved by the SCI is available based on the RSRP failing to satisfy the RSRP threshold.

At 535, the first UE 115-c may compare the determined resource availability (RA) associated with the active duration of the sidelink DRX pattern at the second UE 115-d with a threshold resource availability ($RA_{Thresh}$) The first UE 115-c may perform the comparison between the resource availability and the threshold resource availability at 535 based on receiving the control message indicating the resource pool at 505, receiving the control message indicating the sidelink DRX pattern at 510, receiving the SCI at 515, determining an RSRP for the SCI at 520, performing the comparison at 525, determining the resource availability at 530, or any combination thereof.

In some aspects, the first UE 115-c may perform the comparison at 535 to determine whether or not it may schedule a sidelink message between the first UE 115-c and the second UE 115-d within the active duration of the first sidelink DRX pattern at the second UE 115-d. In particular, the first UE 115-d may determine whether it may schedule a sidelink transmission within the active duration if the resource availability based on whether or not the resource availability (e.g., quantity or percentage of available resources) satisfies the threshold resource availability. In some aspects, the resource availability may satisfy the threshold resource availability if the resource availability is greater than or equal to the threshold resource availability (e.g., threshold satisfied if $RA \geq RA_{Thresh}$). Conversely, the resource availability may fail to satisfy the threshold resource availability if the resource availability is less than the threshold resource availability (e.g., threshold not satisfied if $RA < RA_{Thresh}$).

For example, in some cases, the first UE 115-c may determine that the resource availability satisfies the threshold resource availability (e.g., $RA \geq RA_{Thresh}$). As such, the first UE 115-c may determine that there are sufficient resources within the active duration of the first sidelink DRX pattern at the second UE 115-d to schedule a sidelink message within the active duration. By way of another example, in other cases, the first UE 115-c may determine that the resource availability fails to satisfy the threshold resource availability (e.g., $RA<RA_{Thresh}$). As such, the first UE 115-c may determine that there are insufficient resources within the active duration of the first sidelink DRX pattern at the second UE 115-d to schedule a sidelink message within the active duration. Moreover, by determining that there are insufficient resources within the active duration, the first UE 115-c may be configured to determine that it may schedule a sidelink message with the second UE 115-d within the inactive duration of the first sidelink DRX pattern.

In some aspects, it may be preferable to schedule sidelink messages with the second UE 115-d within the active duration of the first sidelink DRX pattern at the second UE 115-d. As such, the first UE 115-c may be configured to selectively adjust the threshold resource availability ($RA_{Thresh}$) and/or the RSRP threshold ($RSRP_{Thresh}$) in an attempt to be able to schedule sidelink messages within the active duration. For example, in cases where the first UE 115-c determines that there are insufficient resources within the active duration of the first sidelink DRX pattern to schedule a sidelink message (e.g., $RA<RA_{Thresh}$), the first UE 115-c may selectively adjust (e.g., selectively decrease) the threshold resource availability to generate a second, or adjusted, threshold resource availability. In this example, the first UE 115-d may then compare the determined resource availably to the resource second (e.g., adjusted) threshold resource availability.

In other cases, the first UE 115-c may selectively adjust the RSRP threshold. For example, in cases where the first UE 115-c determines that there are insufficient resources within the active duration of the first sidelink DRX pattern to schedule a sidelink message (e.g., $RA<RA_{Thresh}$), the first UE 115-c may selectively adjust (e.g., selectively increase) the RSRP threshold to generate a second, or adjusted, RSRP threshold. For instance, the first UE 115-c may add 3 dB to the first RSRP threshold. In this example, the first UE 115-c may then compare the determined RSRP with the second (e.g., adjusted) RSRP threshold at 525 to determine whether the sidelink resource reserved by the SCI at 515 are available, and may then use this determination to determine the threshold resource availability at 530 and perform the comparison at 535. In some aspects, the first UE 115-c may be configured to iteratively increase the RSRP threshold until it reaches a maximum RSRP threshold. The maximum RSRP threshold may be signaled to the first UE 115-c by the base station 105-b and/or pre-configured at the first UE 115-c. If the resource availability determined based on the maximum RSRP threshold still fails to satisfy the threshold resource availability, the first UE 115-c may determine that there are insufficient resources to schedule a sidelink message within the active duration of the first sidelink DRX pattern at the second UE 115-d.

At 540, the first UE 115-c may transmit an SCI to the second UE 115-d, where the SCI indicates a resource reservation for a sidelink resource associated with a sidelink message. In this regard, the first UE 115-c may transmit an SCI which reserves a sidelink resource for a sidelink message between the first UE 115-c and the second UE 115-d. In some aspects, the first UE 115-c may transmit the SCI within the active duration of the first sidelink DRX pattern at the second UE 115-d. Moreover, the sidelink resource reserved by the SCI may be positioned within at least a portion of the inactive duration of the first sidelink DRX pattern at the second UE 115-d. As such, the SCI at 540 may schedule a sidelink message between the first UE 115-c and the second UE 115-d within at least a portion of the inactive duration.

The sidelink message scheduled by the SCI at 540 may include a periodic transmission, an aperiodic transmission, or both. For example, in cases where the resource pool for the sidelink channel is configured to support periodic sidelink transmissions, the sidelink message scheduled by the SCI may include a periodic sidelink message.

The first UE 115-c may transmit the SCI indicating the resource reservation at 540 based on receiving the control message indicating the resource pool at 505, receiving the control message indicating the sidelink DRX pattern at 510, receiving the SCI at 515, determining an RSRP for the SCI at 520, performing the comparison at 525, determining the resource availability at 530, performing the comparison at 535, or any combination thereof.

For example, the first UE 115-c may transmit the SCI indicating the resource reservation within the inactive duration based on the resource availability within the active duration of the first sidelink DRX pattern which was determined at 530. For instance, in some cases, the first UE 115-c may transmit the SCI indicating the resource reservation within the inactive duration based on the resource availability within the active duration failing to satisfy the threshold resource availability at 535, failing to satisfy a second (e.g., adjusted) threshold resource availability at 535, or both. By way of another example, the first UE 115-c may transmit the SCI indicating the resource reservation within the inactive duration based on the resource availability being associated with (e.g., corresponding to) a first priority ($P_i$) associated with the sidelink message scheduled by the SCI at 540.

In some aspects, the first UE 115-c may transmit the SCI indicating the resource reservation within the inactive duration of the first sidelink DRX pattern at the second UE 115-d based on a second sidelink DRX pattern (or lack thereof) configured at the first UE 115-c. In particular, the first UE 115-c may transmit the SCI reserving the sidelink resource within the inactive duration of the sidelink DRX pattern in cases where the first UE is able to more efficiently monitor for other sidelink messages scheduled during the inactive duration, such as cases where the first UE 115-c is not configured with a sidelink DRX pattern, or in cases where the first UE 115-c has longer active durations of a sidelink DRX pattern.

For example, in some cases, the first UE 115-c may transmit the SCI indicating the resource reservation within the inactive duration based on the first UE 115-c not being configured with a sidelink DRX pattern. Without being configured with a sidelink DRX pattern, the first UE 115-c may be configured to remain in an active state, and may therefore be able to more effectively monitor for other sidelink messages scheduled within the inactive duration. As such, by remaining in an active state, the first UE 115-c may be able to determine whether other sidelink messages have been previously scheduled within the inactive duration, which may reduce (or eliminate) potential scheduling conflicts within the inactive duration.

In other cases, the first UE 115-c may transmit the SCI reserving the sidelink resource in the inactive duration even when the first UE 115-c is configured with a second sidelink DRX pattern. For example, the first UE 115-c may be configured with a second sidelink DRX pattern including one or more active durations and one or more inactive durations. In this example, the resource reservation (e.g., sidelink resource) indicated by the SCI at 540 may occur within the active duration of the second sidelink DRX pattern at the first UE 115-c. In some cases, the active durations of the second sidelink DRX pattern at the first UE 115-c may be longer than the active durations of the first sidelink DRX pattern at the second UE 115-*d* in the time domain. In such cases, with longer active durations, the first UE 115-*c* may be able to more effectively monitor for other sidelink messages scheduled within the inactive duration. As such, the first UE 115-*c* may be able to determine whether other sidelink messages have been previously scheduled within the inactive duration, which may reduce (or eliminate) potential scheduling conflicts within the inactive duration.

In some cases, the first UE 115-*c* may transmit the SCI reserving the sidelink resource in the inactive duration of the first sidelink DRX pattern at the second UE 115-*b* based on whether or not periodic sidelink messages are configured within the resource pool allocated for the sidelink channel. For example, the resource pool of the sidelink channel may be configured for periodic sidelink transmissions every K slots (e.g., periodicity of K slots), and the inactive duration of the first sidelink DRX cycle may occur in slot N. In this example, if the first UE 115-*c* was not able to receive communications in any of slots N-iK, where i is an integer, the first UE 115-*c* may not know whether a periodic sidelink transmission was scheduled within slot N of the inactive duration of the first sidelink DRX pattern. Accordingly, in some aspects, the first UE 115-*c* may be configured to transmit the SCI reserving the sidelink resource in the inactive duration if the first UE 115-*c* was able to receive communications in any of slots N-iK, where i is an integer and K is a periodicity configured for the resource pool. In such cases, the first UE 115-*c* may determine that no periodic transmissions are scheduled to be performed within the inactive duration.

Moreover, the first UE 115-*c* may be configured to transmit the SCI reserving the sidelink resource in the inactive duration based on determining that the resource pool is not configured for periodic sidelink transmissions. In such cases, there may be no periodic sidelink transmissions, and therefore no possibility of interference with periodic sidelink transmissions by scheduling the sidelink message within the inactive duration. For instance, if the first UE 115-*c* is configured with a second sidelink DRX pattern and the active durations of the first and second sidelink DRX patterns are aligned, the first UE 115-*c* may be able to schedule sidelink messages within the inactive duration of the first sidelink DRX pattern at the second UE 115-*d* if periodic sidelink transmissions are not enabled.

At 545, the second UE 115-*d* may initiate an inactivity timer. In some aspects, the second UE 115-*d* may initiate the inactivity timer based on receiving the SCI indicating the resource reservation within the inactive duration of the first sidelink DRX period at the second UE 115-*d*. In particular, the second UE 115-*d* may initiate the inactivity timer at 545 in order to extend the active duration of the first sidelink DRX pattern, and delay entering the inactive duration, in order to perform the sidelink message scheduled by the SCI. As such, the second UE 115-*d* may extend the active duration of the first sidelink DRX pattern at the second UE 115-*d* based initiating the inactivity timer at 545.

At 550, the first UE 115-*c* may receive a feedback message from the second UE 115-*d*. The feedback message may include an ACK, NACK, or both. In some aspects, the first UE 115-*c* may receive the feedback message via a sidelink feedback channel (e.g., PSFCH). In some cases, the second UE 115-*d* may transmit the feedback message in response to the SCI at 540, based on initiating the inactivity timer at 545, or both.

In some aspects, the feedback message may indicate that the second UE 115-*d* will extend the active duration of the first sidelink DRX pattern (e.g., delay entering the inactive duration) in order to perform the sidelink message scheduled by the SCI at 540. In this regard, the first UE 115-*c* may be configured to determine that the second UE 115-*d* will be awake (e.g., active) so that it may perform the scheduled sidelink message within the inactive duration of the first sidelink DRX pattern at the second UE 115-*d*.

At 555, the first UE 115-*c* and the second UE 115-*d* may communicate with one another via the sidelink message. In this regard, the first UE 115-*c* and the second UE 115-*d* may communicate with one another by performing the sidelink message via the sidelink channel within the sidelink resource indicated in the resource reservation of the SCI at 540. The UEs 115-*c*, 115-*d* may be configured to communicate (e.g., perform) the sidelink message at 555 based on transmitting/receiving the SCI at 540, initiating the inactivity timer at 545, transmitting/receiving the feedback message at 550, or any combination thereof.

For example, the first UE 115-*c* may transmit the sidelink message to the second UE 115-*d*. In some cases, the first UE 115-*c* may be configured to transmit (or refrain from transmitting) the sidelink message at 555 based on whether or not it received a feedback message from the second UE 115-*d* at 550. For example, the first UE 115-*c* may be configured to transmit the sidelink message at 555 only if it received a feedback message (e.g., ACK/NACK) from the second UE 115-*d* at 550. By way of another example, the second UE 115-*d* may transmit the sidelink message to the first UE 115-*c* at 555.

At 560, the second UE 115-*d* may determine an expiration of the inactivity timer. The second UE 115-*d* may determine an expiration of the inactivity timer based on initiating the inactivity timer at 545, a duration of the inactivity timer, or both. The duration of the inactivity timer may be signaled to the second UE 115-*b* (e.g., via RRC signaling), pre-configured at the second UE 115-*d*, or both.

At 565, the second UE 115-*d* may enter the inactive duration of the first sidelink DRX pattern at the second UE 115-*d*. In particular the second UE 115-*d* may enter the inactive duration based on determining the expiration of the inactivity timer at 560.

Techniques described herein may improve sidelink network coordination to reduce sidelink conflicts while preventing significant increases in signaling overhead. In particular, techniques described herein may enable the first UE 115-*c* to schedule sidelink messages within inactive durations of the sidelink DRX pattern of the second UE 115-*d*, while reducing (or eliminating) conflicts with sidelink messages scheduled via other UEs 115 (e.g., third UE 115-*e*). By enabling sidelink messages to be scheduled within inactive durations of DRX patterns while simultaneously reducing conflicts between sidelink messages, techniques described herein may enable improved sidelink resource utilization and reduce sidelink interference. Moreover, techniques described herein may enable more efficient sidelink DRX patterns to conserve power at the UEs 115, while simultaneously reducing a latency of sidelink communications.

Figure 6:
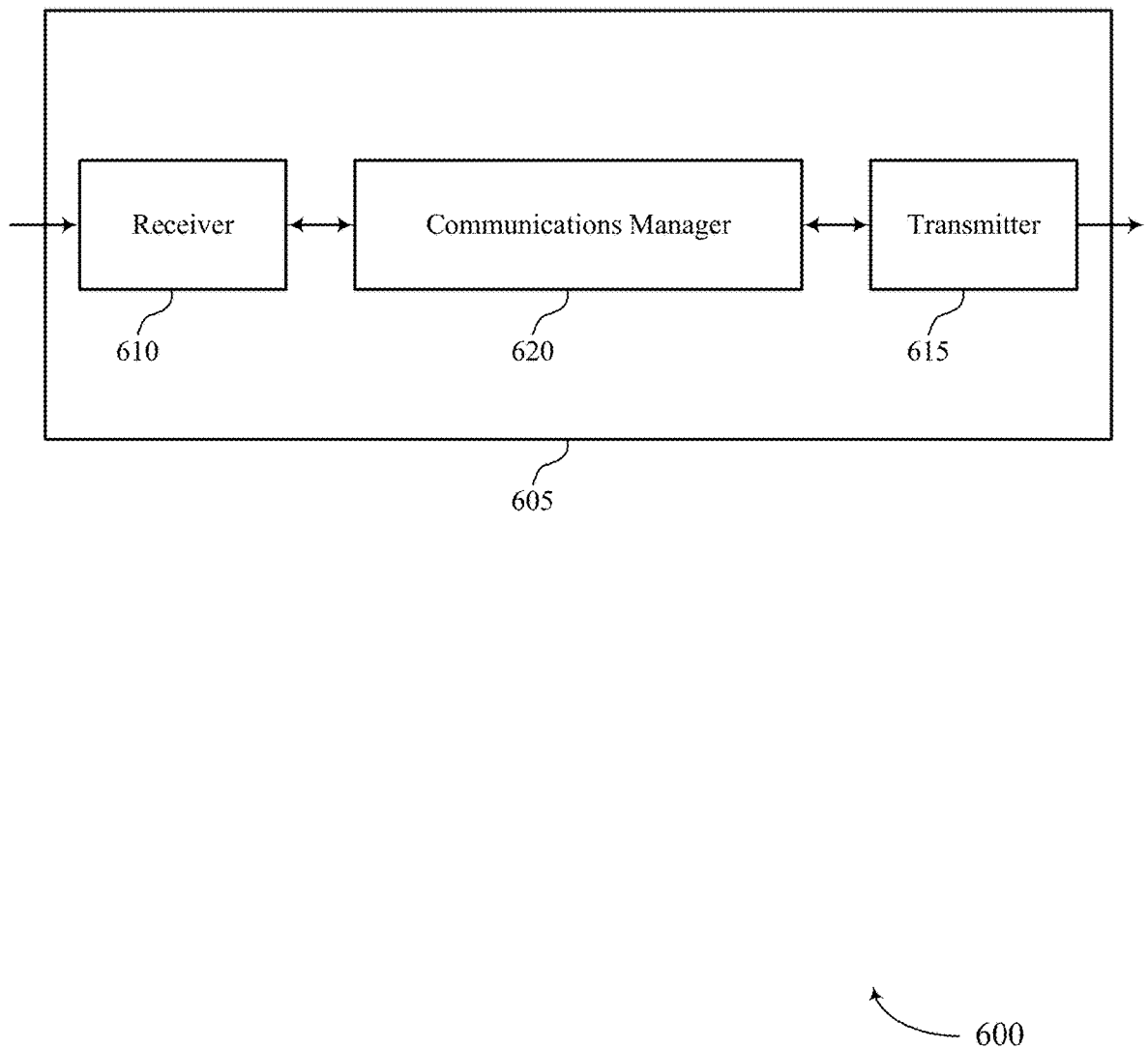
FIGS. 6 and 7 show block diagrams of devices that support techniques for sidelink resource reservations in accordance with aspects of the present disclosure.

FIG. 6 shows a block diagram 600 of a device 605 that supports techniques for sidelink resource reservations in accordance with aspects of the present disclosure. The device 605 may be an example of aspects of a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to techniques for sidelink resource reservations). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to techniques for sidelink resource reservations). In some examples, the transmitter 615 may be co-located with a receiver 610 in a transceiver module. The transmitter 615 may utilize a single antenna or a set of multiple antennas.

The communications manager 620, the receiver 610, the transmitter 615, or various combinations thereof or various components thereof may be examples of means for performing various aspects of techniques for sidelink resource reservations as described herein. For example, the communications manager 620, the receiver 610, the transmitter 615, or various combinations or components thereof may support a method for performing one or more of the functions described herein.

In some examples, the communications manager 620, the receiver 610, the transmitter 615, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 620, the receiver 610, the transmitter 615, or various combinations or components thereof may be implemented in code (e.g., as communications management software or firmware) executed by a processor. If implemented in code executed by a processor, the functions of the communications manager 620, the receiver 610, the transmitter 615, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 620 may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communication at a first UE in accordance with examples as disclosed herein. For example, the communications manager 620 may be configured as or otherwise support a means for transmitting, to a second UE and within an active duration of a first sidelink discontinuous reception pattern of the second UE, sidelink control information indicating a resource reservation for a sidelink resource of a sidelink channel within at least a portion of an inactive duration of the first sidelink discontinuous reception pattern. The communications manager 620 may be configured as or otherwise support a means for communicating, with the second UE via the sidelink channel, a sidelink message within the sidelink resource indicated in the resource reservation.

Additionally or alternatively, the communications manager 620 may support wireless communication at a second UE in accordance with examples as disclosed herein. For example, the communications manager 620 may be configured as or otherwise support a means for receiving, from a first UE and within an active duration of a first sidelink discontinuous reception pattern of the second UE, sidelink control information indicating a resource reservation for a sidelink resource of a sidelink channel within at least a portion of an inactive duration of the first sidelink discontinuous reception pattern. The communications manager 620 may be configured as or otherwise support a means for communicating, with the first UE via the sidelink channel, a sidelink message within the sidelink resource indicated in the resource reservation.

By including or configuring the communications manager 620 in accordance with examples as described herein, the device 605 (e.g., a processor controlling or otherwise coupled to the receiver 610, the transmitter 615, the communications manager 620, or a combination thereof) may support techniques for improved sidelink network coordination to reduce sidelink conflicts while preventing significant increases in signaling overhead. In particular, techniques described herein may enable the first UE 115-c to schedule sidelink messages within inactive durations of the sidelink DRX pattern of the second UE 115-d, while reducing (or eliminating) conflicts with sidelink messages scheduled via other UEs 115 (e.g., third UE 115-e). By enabling sidelink messages to be scheduled within inactive durations of DRX patterns while simultaneously reducing conflicts between sidelink messages, techniques described herein may enable improved sidelink resource utilization and reduce sidelink interference. Moreover, techniques described herein may enable more efficient sidelink DRX patterns to conserve power at the UEs 115, while simultaneously reducing a latency of sidelink communications.

Figure 7:
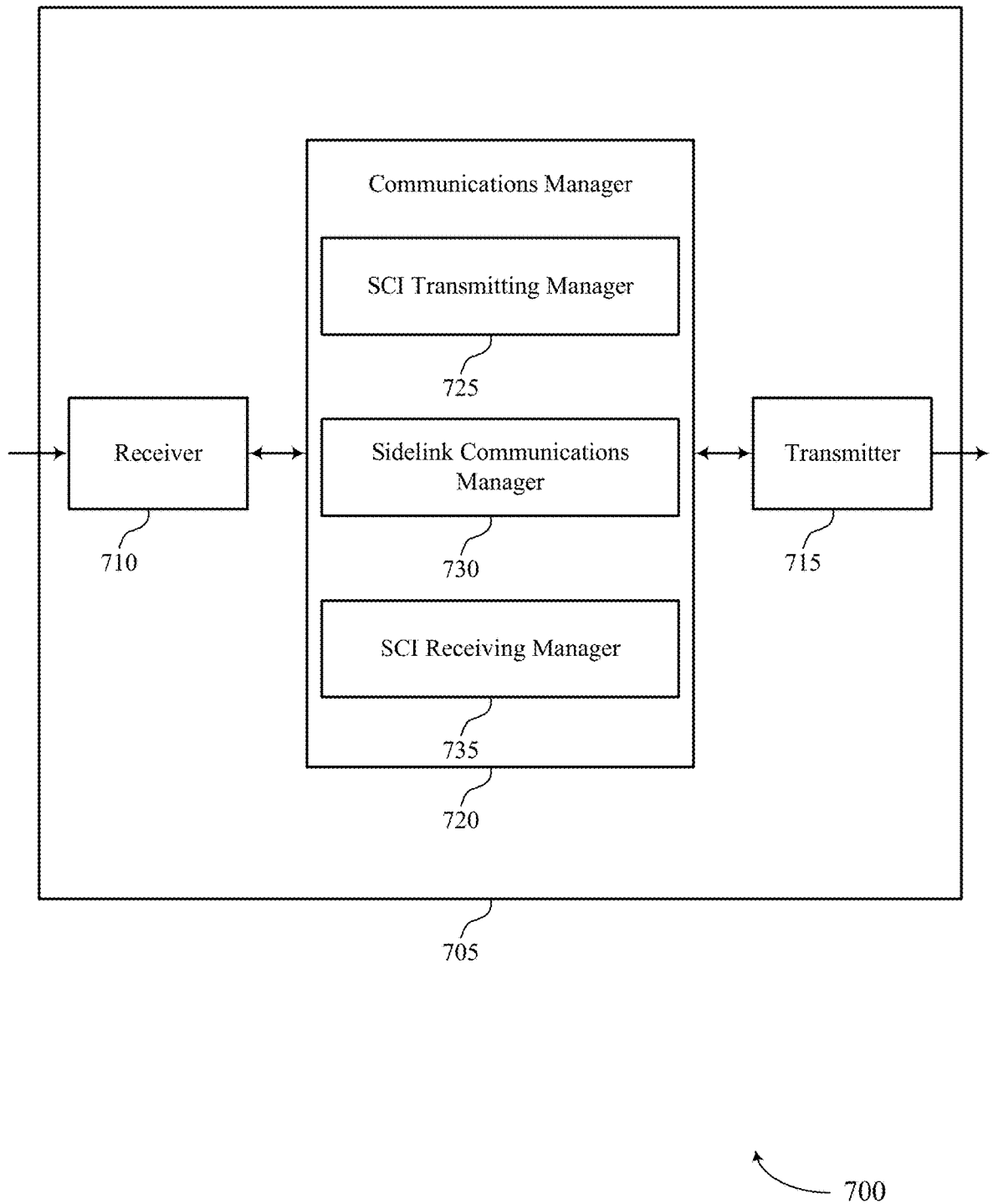

FIG. 7 shows a block diagram 700 of a device 705 that supports techniques for sidelink resource reservations in accordance with aspects of the present disclosure. The device 705 may be an example of aspects of a device 605 or a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to techniques for sidelink resource reservations). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to techniques for sidelink resource reservations). In some examples, the transmitter 715 may be co-located with a receiver 710 in a transceiver module. The transmitter 715 may utilize a single antenna or a set of multiple antennas.

The device 705, or various components thereof, may be an example of means for performing various aspects of techniques for sidelink resource reservations as described herein. For example, the communications manager 720 may include an SCI transmitting manager 725, a sidelink communications manager 730, an SCI receiving manager 735, or any combination thereof. The communications manager 720 may be an example of aspects of a communications manager 620 as described herein. In some examples, the communications manager 720, or various components thereof, may be configured to perform various operations (e.g., receiving, monitoring, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to receive information, transmit information, or perform various other operations as described herein.

The communications manager 720 may support wireless communication at a first UE in accordance with examples as disclosed herein. The SCI transmitting manager 725 may be configured as or otherwise support a means for transmitting, to a second UE and within an active duration of a first sidelink discontinuous reception pattern of the second UE, sidelink control information indicating a resource reservation for a sidelink resource of a sidelink channel within at least a portion of an inactive duration of the first sidelink discontinuous reception pattern. The sidelink communications manager 730 may be configured as or otherwise support a means for communicating, with the second UE via the sidelink channel, a sidelink message within the sidelink resource indicated in the resource reservation.

Additionally or alternatively, the communications manager 720 may support wireless communication at a second UE in accordance with examples as disclosed herein. The SCI receiving manager 735 may be configured as or otherwise support a means for receiving, from a first UE and within an active duration of a first sidelink discontinuous reception pattern of the second UE, sidelink control information indicating a resource reservation for a sidelink resource of a sidelink channel within at least a portion of an inactive duration of the first sidelink discontinuous reception pattern. The sidelink communications manager 730 may be configured as or otherwise support a means for communicating, with the first UE via the sidelink channel, a sidelink message within the sidelink resource indicated in the resource reservation.

Figure 8:
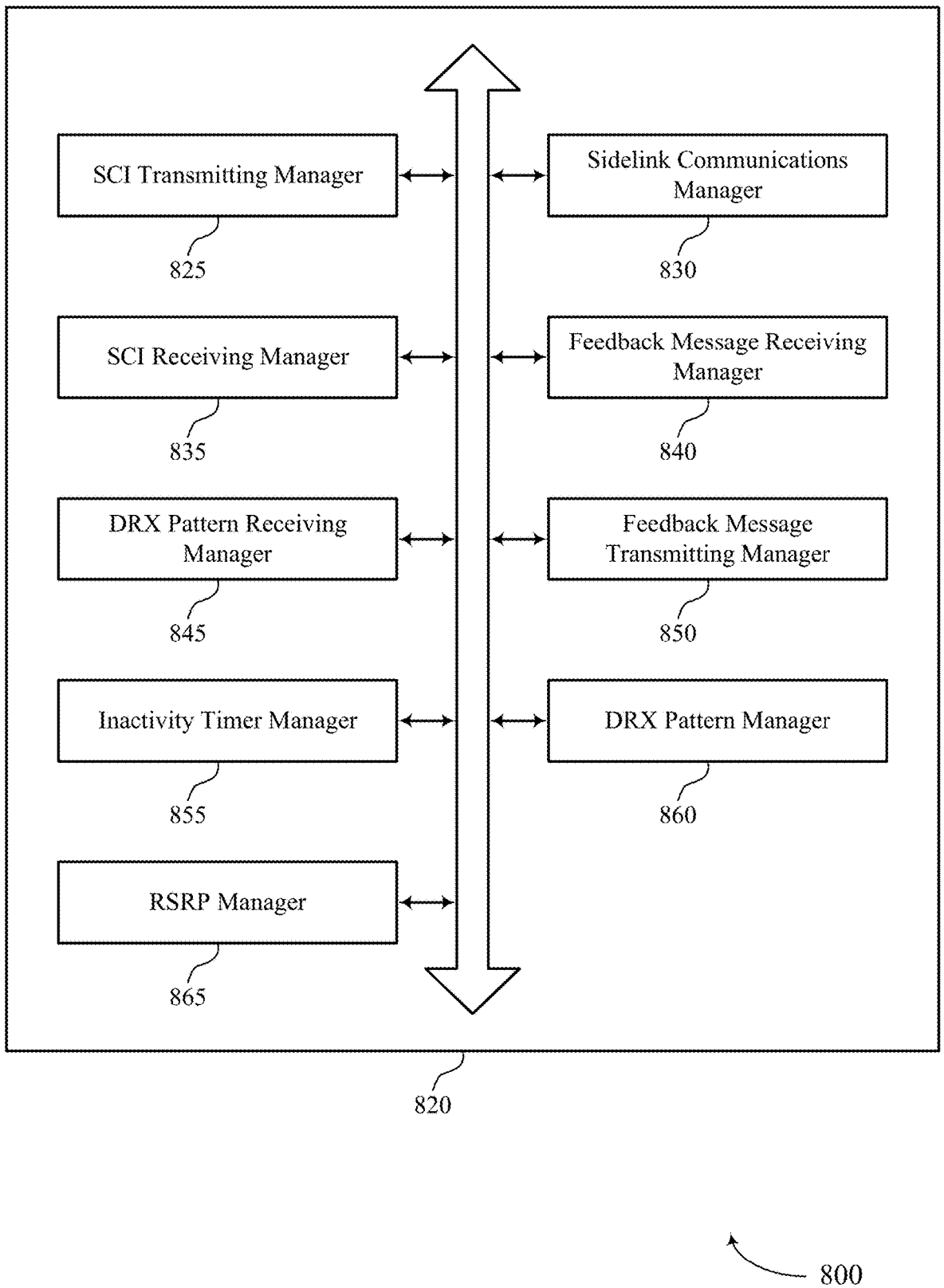
FIG. 8 shows a block diagram of a communications manager that supports techniques for sidelink resource reservations in accordance with aspects of the present disclosure.

FIG. 8 shows a block diagram 800 of a communications manager 820 that supports techniques for sidelink resource reservations in accordance with aspects of the present disclosure. The communications manager 820 may be an example of aspects of a communications manager 620, a communications manager 720, or both, as described herein. The communications manager 820, or various components thereof, may be an example of means for performing various aspects of techniques for sidelink resource reservations as described herein. For example, the communications manager 820 may include an SCI transmitting manager 825, a sidelink communications manager 830, an SCI receiving manager 835, a feedback message receiving manager 840, a DRX pattern receiving manager 845, a feedback message transmitting manager 850, an inactivity timer manager 855, a DRX pattern manager 860, an RSRP manager 865, or any combination thereof. Each of these components may communicate, directly or indirectly, with one another (e.g., via one or more buses).

The communications manager 820 may support wireless communication at a first UE in accordance with examples as disclosed herein. The SCI transmitting manager 825 may be configured as or otherwise support a means for transmitting, to a second UE and within an active duration of a first sidelink discontinuous reception pattern of the second UE, sidelink control information indicating a resource reservation for a sidelink resource of a sidelink channel within at least a portion of an inactive duration of the first sidelink discontinuous reception pattern. The sidelink communications manager 830 may be configured as or otherwise support a means for communicating, with the second UE via the sidelink channel, a sidelink message within the sidelink resource indicated in the resource reservation.

In some examples, to support transmitting the sidelink control information, the SCI transmitting manager 825 may be configured as or otherwise support a means for transmitting the sidelink control information indicating the resource reservation based on a resource availability within the active duration of the first sidelink discontinuous reception pattern. In some examples, to support transmitting the sidelink control information, the SCI transmitting manager 825 may be configured as or otherwise support a means for transmitting the sidelink control information indicating the resource reservation based on the resource availability failing to satisfy a threshold resource availability.

In some examples, to support transmitting the sidelink control information, the SCI transmitting manager 825 may be configured as or otherwise support a means for transmitting the sidelink control information indicating the resource reservation based on the resource availability failing to satisfy a second threshold resource availability that is adjusted relative to a first threshold resource availability. In some examples, to support transmitting the sidelink control information, the SCI transmitting manager 825 may be configured as or otherwise support a means for transmitting the sidelink control information indicating the resource reservation based on the resource availability corresponding to a first priority associated with the sidelink message.

In some examples, the SCI receiving manager 835 may be configured as or otherwise support a means for receiving, from an additional UE, additional sidelink control information indicating an additional resource reservation for an additional sidelink resource of the sidelink channel within the active duration of the first sidelink discontinuous reception pattern. In some examples, the RSRP manager 865 may be configured as or otherwise support a means for determining a reference signal received power value associated with reception of the additional sidelink control information. In some examples, the RSRP manager 865 may be configured as or otherwise support a means for comparing the reference signal received power value to a reference signal received power threshold, where determining the resource availability of the sidelink channel within the active duration is based on the comparison. In some examples, the reference signal received power threshold is based on a first priority associated with the sidelink message, an additional priority associated with an additional sidelink message scheduled within the additional sidelink resource, or both.

In some examples, the feedback message receiving manager 840 may be configured as or otherwise support a means for receiving a feedback message from the second UE in response to the sidelink control information and based on the sidelink resource being positioned within at least the portion of the inactive duration, where communicating the sidelink message is based on receiving the feedback message. In some examples, to support receiving the feedback message, the feedback message receiving manager 840 may be configured as or otherwise support a means for receiving the feedback message via a sidelink feedback channel.

In some examples, the first UE is configured to remain in an active state. In some examples, the resource reservation occurs within an active duration of a second sidelink discontinuous reception pattern of the first UE. In some examples, the active duration of the second sidelink discontinuous reception pattern is longer than the active duration of the first sidelink discontinuous reception pattern.

In some examples, to support transmitting the sidelink control information, the SCI transmitting manager 825 may be configured as or otherwise support a means for transmitting the sidelink control information indicating the resource reservation based on determining that a periodic sidelink transmission is not configured within a resource pool allocated for the sidelink channel.

In some examples, an active duration of second discontinuous reception pattern of the first UE is aligned in the time domain with the active duration of the first sidelink discontinuous reception pattern. In some examples, the sidelink message includes a periodic sidelink message, an aperiodic sidelink message, or both.

In some examples, the DRX pattern receiving manager 845 may be configured as or otherwise support a means for receiving an indication of the first sidelink discontinuous reception pattern of the second UE from the second UE, a base station, or both.

Additionally or alternatively, the communications manager 820 may support wireless communication at a second UE in accordance with examples as disclosed herein. The SCI receiving manager 835 may be configured as or otherwise support a means for receiving, from a first UE and within an active duration of a first sidelink discontinuous reception pattern of the second UE, sidelink control information indicating a resource reservation for a sidelink resource of a sidelink channel within at least a portion of an inactive duration of the first sidelink discontinuous reception pattern. In some examples, the sidelink communications manager 830 may be configured as or otherwise support a means for communicating, with the first UE via the sidelink channel, a sidelink message within the sidelink resource indicated in the resource reservation.

In some examples, to support receiving the sidelink control information, the SCI receiving manager 835 may be configured as or otherwise support a means for receiving the sidelink control information indicating the resource reservation based on a resource availability within the active duration of the first sidelink discontinuous reception pattern. In some examples, to support receiving the sidelink control information, the SCI receiving manager 835 may be configured as or otherwise support a means for receiving the sidelink control information indicating the resource reservation based on the resource availability failing to satisfy a threshold resource availability.

In some examples, to support receiving the sidelink control information, the SCI receiving manager 835 may be configured as or otherwise support a means for receiving the sidelink control information indicating the resource reservation based on the resource availability failing to satisfy a second threshold resource availability that is adjusted relative to a first threshold resource availability. In some examples, to support receiving the sidelink control information, the SCI receiving manager 835 may be configured as or otherwise support a means for receiving the sidelink control information indicating the resource reservation based on the resource availability corresponding to a first priority associated with the sidelink message.

In some examples, the feedback message transmitting manager 850 may be configured as or otherwise support a means for transmitting a feedback message to the first UE in response to the sidelink control information and based on the sidelink resource being positioned within at least the portion of the inactive duration, where communicating the sidelink message is based on transmitting the feedback message. In some examples, to support transmitting the feedback message, the feedback message transmitting manager 850 may be configured as or otherwise support a means for transmitting the feedback message via a sidelink feedback channel.

In some examples, the first UE is configured to remain in an active state. In some examples, the resource reservation occurs within an active duration of a second sidelink discontinuous reception pattern of the first UE. In some examples, the active duration of the second sidelink discontinuous reception pattern is longer than the active duration of the first sidelink discontinuous reception pattern.

In some examples, to support receiving the sidelink control information, the SCI receiving manager 835 may be configured as or otherwise support a means for receiving the sidelink control information indicating the resource reservation based on a resource pool allocated for the sidelink channel not being configured for a periodic sidelink transmission.

In some examples, the inactivity timer manager 855 may be configured as or otherwise support a means for initiating an inactivity timer based on receiving the sidelink control information indicating the resource reservation. In some examples, the DRX pattern manager 860 may be configured as or otherwise support a means for extending the active duration of the first sidelink discontinuous reception pattern based on the inactivity timer, where communicating the sidelink message is based on extending the active duration of the first sidelink discontinuous reception pattern.

Figure 9:
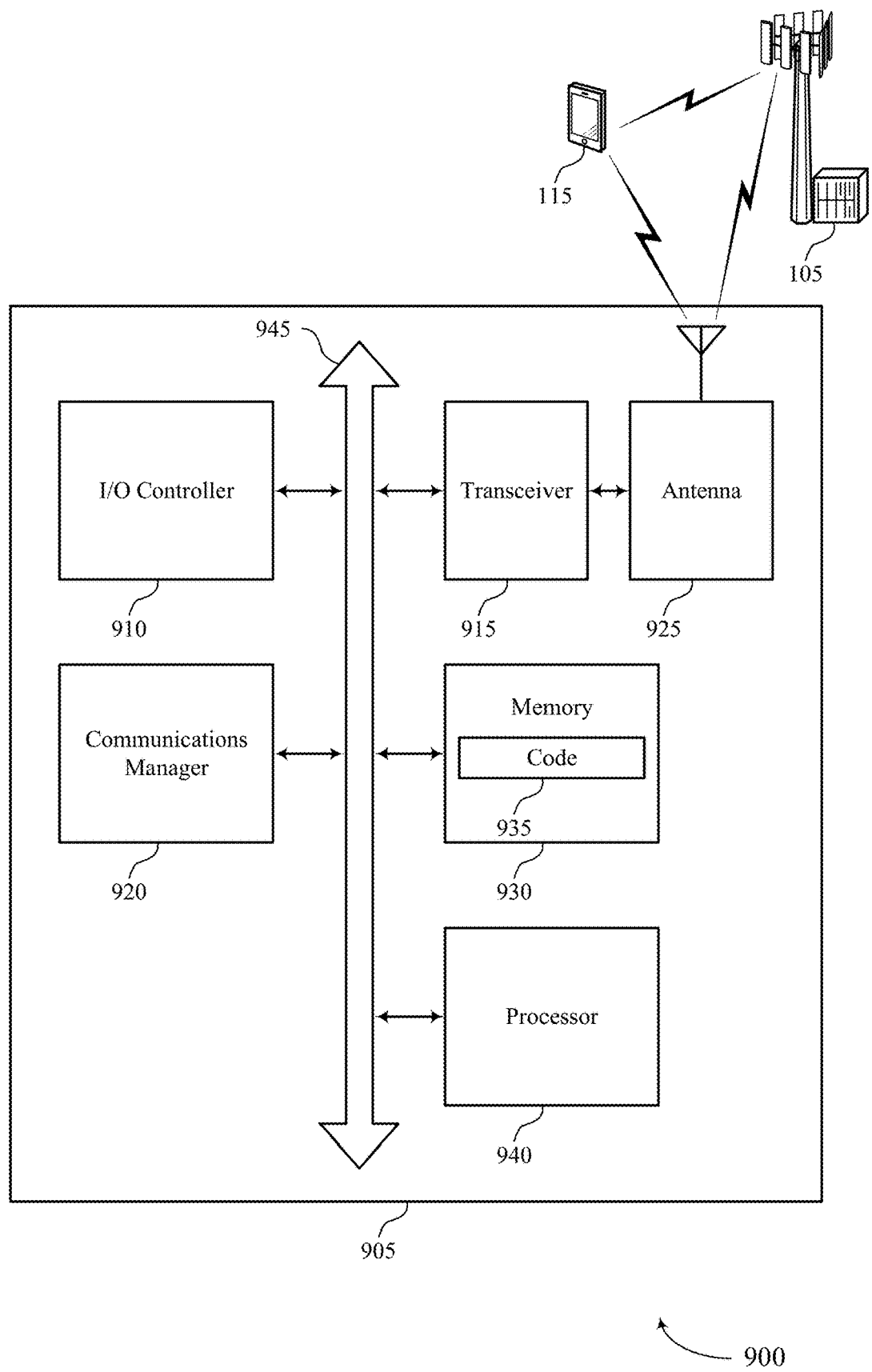
FIG. 9 shows a diagram of a system including a device that supports techniques for sidelink resource reservations in accordance with aspects of the present disclosure.

FIG. 9 shows a diagram of a system 900 including a device 905 that supports techniques for sidelink resource reservations in accordance with aspects of the present disclosure. The device 905 may be an example of or include the components of a device 605, a device 705, or a UE 115 as described herein. The device 905 may communicate wirelessly with one or more base stations 105, UEs 115, or any combination thereof. The device 905 may include components for bi-directional voice and data communications including components for transmitting and receiving communications, such as a communications manager 920, an input/output (I/O) controller 910, a transceiver 915, an antenna 925, a memory 930, code 935, and a processor 940. These components may be in electronic communication or otherwise coupled (e.g., operatively, communicatively, functionally, electronically, electrically) via one or more buses (e.g., a bus 945).

The I/O controller 910 may manage input and output signals for the device 905. The I/O controller 910 may also manage peripherals not integrated into the device 905. In some cases, the I/O controller 910 may represent a physical connection or port to an external peripheral. In some cases, the I/O controller 910 may utilize an operating system such as iOS®, ANDROID®, MS-DOS®, MS-WINDOWS®, OS/2®, UNIX®, LINUX®, or another known operating system. Additionally or alternatively, the I/O controller 910 may represent or interact with a modem, a keyboard, a mouse, a touchscreen, or a similar device. In some cases, the I/O controller 910 may be implemented as part of a processor, such as the processor 940. In some cases, a user may interact with the device 905 via the I/O controller 910 or via hardware components controlled by the I/O controller 910.

In some cases, the device 905 may include a single antenna 925. However, in some other cases, the device 905 may have more than one antenna 925, which may be capable of concurrently transmitting or receiving multiple wireless transmissions. The transceiver 915 may communicate bi-directionally, via the one or more antennas 925, wired, or wireless links as described herein. For example, the transceiver 915 may represent a wireless transceiver and may communicate bi-directionally with another wireless transceiver. The transceiver 915 may also include a modem to modulate the packets, to provide the modulated packets to one or more antennas 925 for transmission, and to demodulate packets received from the one or more antennas 925. The transceiver 915, or the transceiver 915 and one or more antennas 925, may be an example of a transmitter 615, a transmitter 715, a receiver 610, a receiver 710, or any combination thereof or component thereof, as described herein.

The memory 930 may include random access memory (RAM) and read-only memory (ROM). The memory 930 may store computer-readable, computer-executable code 935 including instructions that, when executed by the processor 940, cause the device 905 to perform various functions described herein. The code 935 may be stored in a non-transitory computer-readable medium such as system memory or another type of memory. In some cases, the code 935 may not be directly executable by the processor 940 but may cause a computer (e.g., when compiled and executed) to perform functions described herein. In some cases, the memory 930 may contain, among other things, a basic I/O system (BIOS) which may control basic hardware or software operation such as the interaction with peripheral components or devices.

The processor 940 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In some other cases, a memory controller may be integrated into the processor 940. The processor 940 may be configured to execute computer-readable instructions stored in a memory (e.g., the memory 930) to cause the device 905 to perform various functions (e.g., functions or tasks supporting techniques for sidelink resource reservations). For example, the device 905 or a component of the device 905 may include a processor 940 and memory 930 coupled to the processor 940, the processor 940 and memory 930 configured to perform various functions described herein.

The communications manager 920 may support wireless communication at a first UE in accordance with examples as disclosed herein. For example, the communications manager 920 may be configured as or otherwise support a means for transmitting, to a second UE and within an active duration of a first sidelink discontinuous reception pattern of the second UE, sidelink control information indicating a resource reservation for a sidelink resource of a sidelink channel within at least a portion of an inactive duration of the first sidelink discontinuous reception pattern. The communications manager 920 may be configured as or otherwise support a means for communicating, with the second UE via the sidelink channel, a sidelink message within the sidelink resource indicated in the resource reservation.

Additionally or alternatively, the communications manager 920 may support wireless communication at a second UE in accordance with examples as disclosed herein. For example, the communications manager 920 may be configured as or otherwise support a means for receiving, from a first UE and within an active duration of a first sidelink discontinuous reception pattern of the second UE, sidelink control information indicating a resource reservation for a sidelink resource of a sidelink channel within at least a portion of an inactive duration of the first sidelink discontinuous reception pattern. The communications manager 920 may be configured as or otherwise support a means for communicating, with the first UE via the sidelink channel, a sidelink message within the sidelink resource indicated in the resource reservation.

By including or configuring the communications manager 920 in accordance with examples as described herein, the device 905 may support techniques for improved sidelink network coordination to reduce sidelink conflicts while preventing significant increases in signaling overhead. In particular, techniques described herein may enable the first UE 115-*c* to schedule sidelink messages within inactive durations of the sidelink DRX pattern of the second UE 115-*d*, while reducing (or eliminating) conflicts with sidelink messages scheduled via other UEs 115 (e.g., third UE 115-*e*). By enabling sidelink messages to be scheduled within inactive durations of DRX patterns while simultaneously reducing conflicts between sidelink messages, techniques described herein may enable improved sidelink resource utilization and reduce sidelink interference. Moreover, techniques described herein may enable more efficient sidelink DRX patterns to conserve power at the UEs 115, while simultaneously reducing a latency of sidelink communications.

In some examples, the communications manager 920 may be configured to perform various operations (e.g., receiving, monitoring, transmitting) using or otherwise in cooperation with the transceiver 915, the one or more antennas 925, or any combination thereof. Although the communications manager 920 is illustrated as a separate component, in some examples, one or more functions described with reference to the communications manager 920 may be supported by or performed by the processor 940, the memory 930, the code 935, or any combination thereof. For example, the code 935 may include instructions executable by the processor 940 to cause the device 905 to perform various aspects of techniques for sidelink resource reservations as described herein, or the processor 940 and the memory 930 may be otherwise configured to perform or support such operations.

Figure 10:
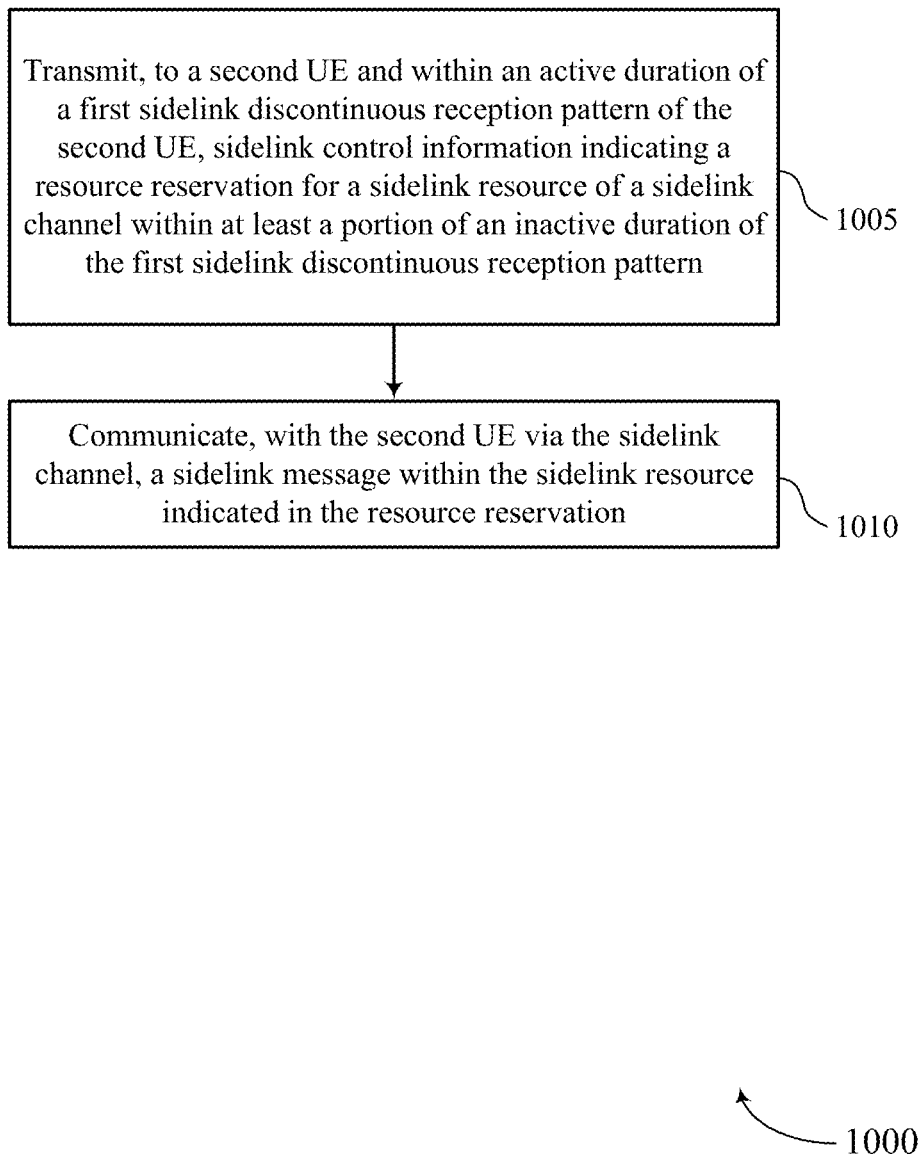
FIGS. 10 through 13 show flowcharts illustrating methods that support techniques for sidelink resource reservations in accordance with aspects of the present disclosure.

FIG. 10 shows a flowchart illustrating a method 1000 that supports techniques for sidelink resource reservations in accordance with aspects of the present disclosure. The operations of the method 1000 may be implemented by a UE or its components as described herein. For example, the operations of the method 1000 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1005, the method may include transmitting, to a second UE and within an active duration of a first sidelink discontinuous reception pattern of the second UE, sidelink control information indicating a resource reservation for a sidelink resource of a sidelink channel within at least a portion of an inactive duration of the first sidelink discontinuous reception pattern. The operations of 1005 may be performed in accordance with examples as disclosed herein. In some examples, aspects of the operations of 1005 may be performed by an SCI transmitting manager 825 as described with reference to FIG. 8.

At 1010, the method may include communicating, with the second UE via the sidelink channel, a sidelink message within the sidelink resource indicated in the resource reservation. The operations of 1010 may be performed in accordance with examples as disclosed herein. In some examples, aspects of the operations of 1010 may be performed by a sidelink communications manager 830 as described with reference to FIG. 8.

Figure 11:
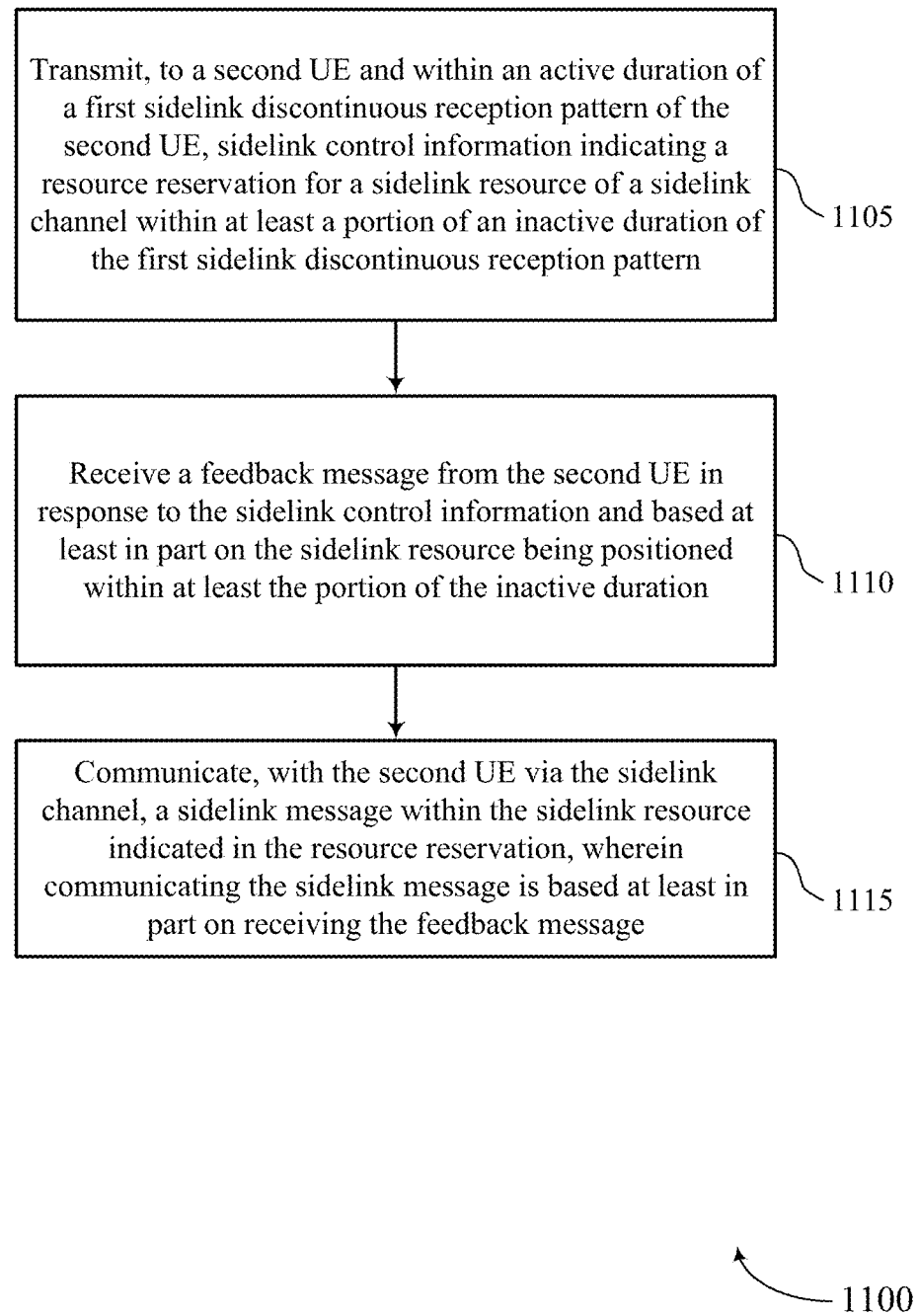

FIG. 11 shows a flowchart illustrating a method 1100 that supports techniques for sidelink resource reservations in accordance with aspects of the present disclosure. The operations of the method 1100 may be implemented by a UE or its components as described herein. For example, the operations of the method 1100 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1105, the method may include transmitting, to a second UE and within an active duration of a first sidelink discontinuous reception pattern of the second UE, sidelink control information indicating a resource reservation for a sidelink resource of a sidelink channel within at least a portion of an inactive duration of the first sidelink discontinuous reception pattern. The operations of 1105 may be performed in accordance with examples as disclosed herein. In some examples, aspects of the operations of 1105 may be performed by an SCI transmitting manager 825 as described with reference to FIG. 8.

At 1110, the method may include receiving a feedback message from the second UE in response to the sidelink control information and based on the sidelink resource being positioned within at least the portion of the inactive duration. The operations of 1110 may be performed in accordance with examples as disclosed herein. In some examples, aspects of the operations of 1110 may be performed by a feedback message receiving manager 840 as described with reference to FIG. 8.

At 1115, the method may include communicating, with the second UE via the sidelink channel, a sidelink message within the sidelink resource indicated in the resource reservation, where communicating the sidelink message is based on receiving the feedback message. The operations of 1115 may be performed in accordance with examples as disclosed herein. In some examples, aspects of the operations of 1115 may be performed by a sidelink communications manager 830 as described with reference to FIG. 8.

Figure 12:
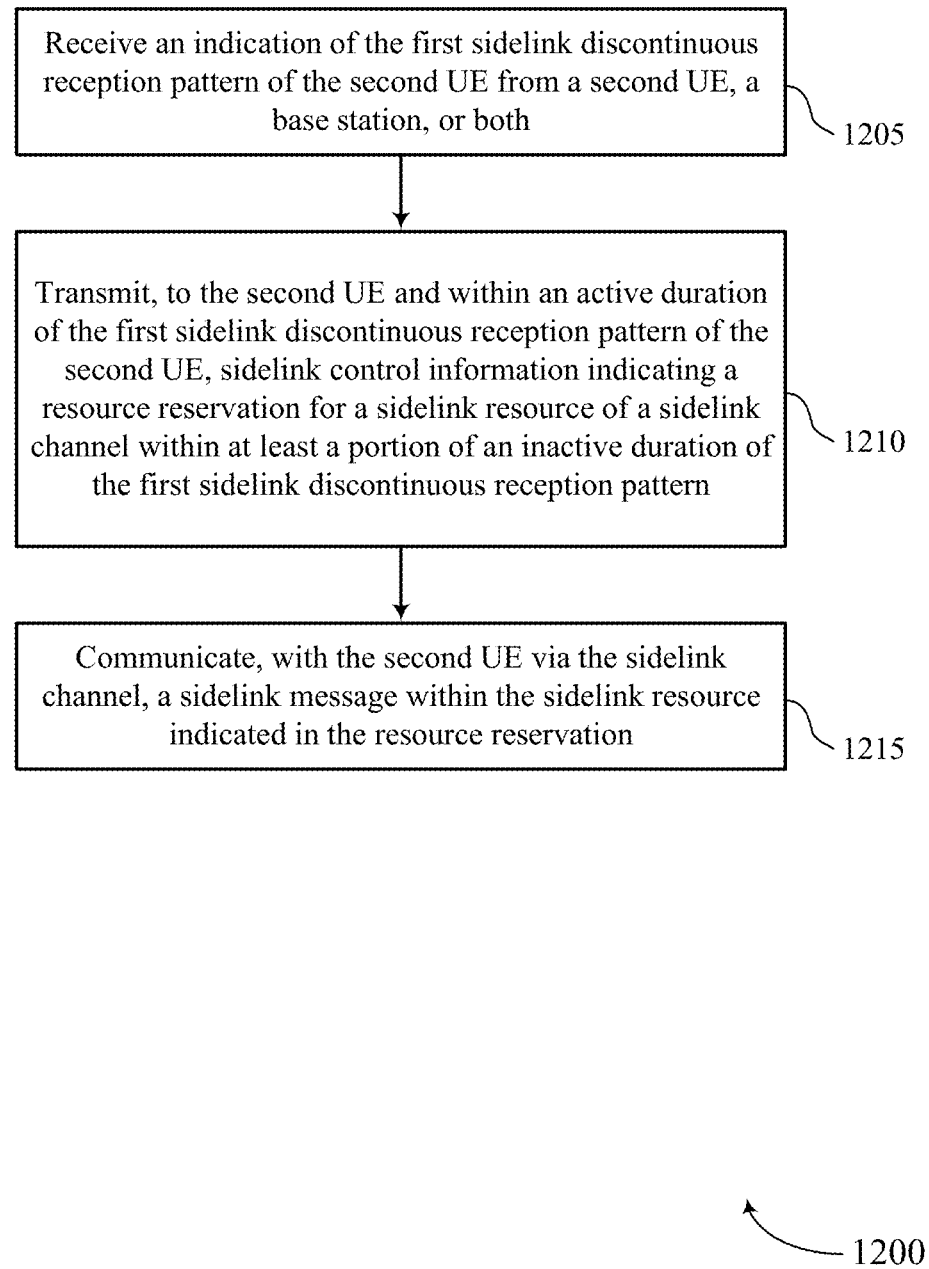

FIG. 12 shows a flowchart illustrating a method 1200 that supports techniques for sidelink resource reservations in accordance with aspects of the present disclosure. The operations of the method 1200 may be implemented by a UE or its components as described herein. For example, the operations of the method 1200 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1205, the method may include receiving an indication of the first sidelink discontinuous reception pattern of a second UE from the second UE, a base station, or both. The operations of 1205 may be performed in accordance with examples as disclosed herein. In some examples, aspects of the operations of 1205 may be performed by a DRX pattern receiving manager 845 as described with reference to FIG. 8.

At 1210, the method may include transmitting, to the second UE and within an active duration of the first sidelink discontinuous reception pattern of the second UE, sidelink control information indicating a resource reservation for a sidelink resource of a sidelink channel within at least a portion of an inactive duration of the first sidelink discontinuous reception pattern. The operations of 1210 may be performed in accordance with examples as disclosed herein. In some examples, aspects of the operations of 1210 may be performed by an SCI transmitting manager 825 as described with reference to FIG. 8.

At 1215, the method may include communicating, with the second UE via the sidelink channel, a sidelink message within the sidelink resource indicated in the resource reservation. The operations of 1215 may be performed in accordance with examples as disclosed herein. In some examples, aspects of the operations of 1215 may be performed by a sidelink communications manager 830 as described with reference to FIG. 8.

Figure 13:
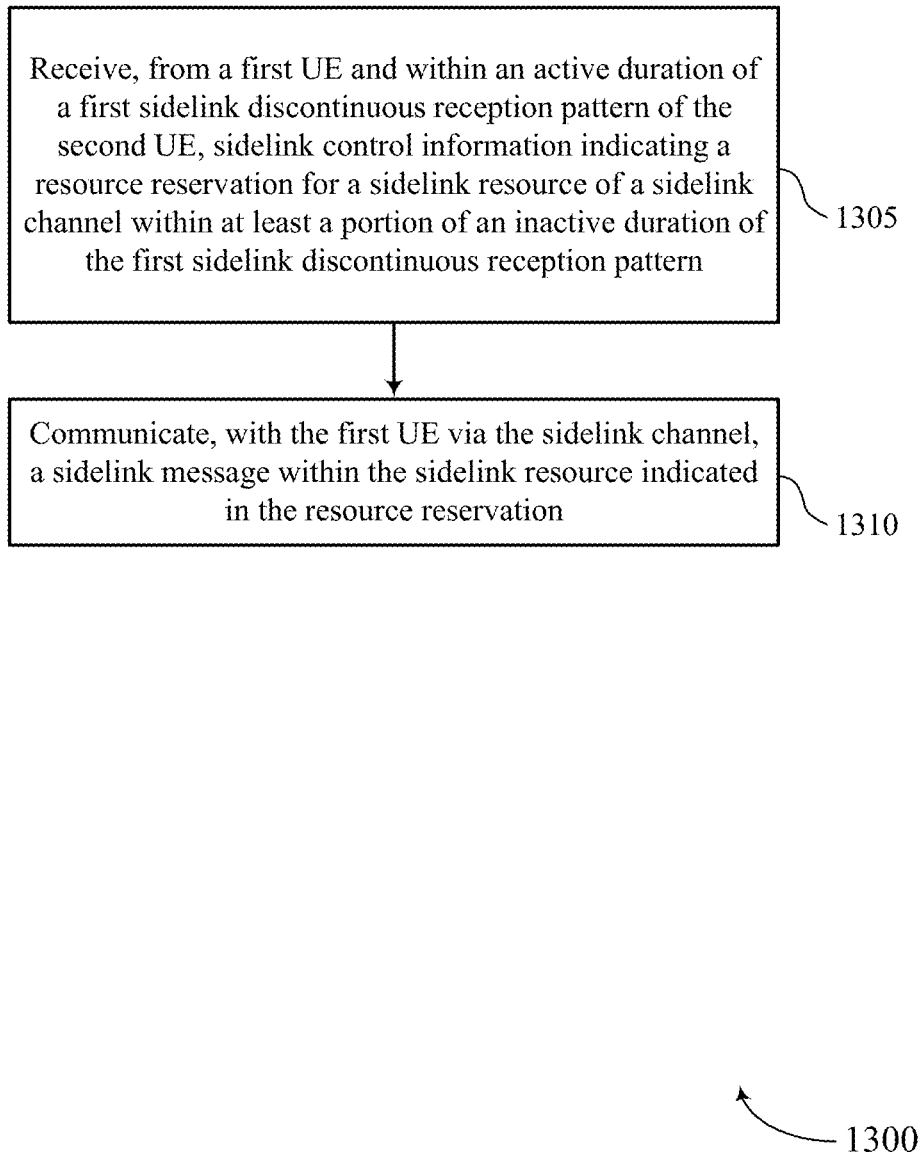

FIG. 13 shows a flowchart illustrating a method 1300 that supports techniques for sidelink resource reservations in accordance with aspects of the present disclosure. The operations of the method 1300 may be implemented by a UE or its components as described herein. For example, the operations of the method 1300 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1305, the method may include receiving, from a first UE and within an active duration of a first sidelink discontinuous reception pattern of the second UE, sidelink control information indicating a resource reservation for a sidelink resource of a sidelink channel within at least a portion of an inactive duration of the first sidelink discontinuous reception pattern. The operations of 1305 may be performed in accordance with examples as disclosed herein. In some examples, aspects of the operations of 1305 may be performed by an SCI receiving manager 835 as described with reference to FIG. 8.

At 1310, the method may include communicating, with the first UE via the sidelink channel, a sidelink message within the sidelink resource indicated in the resource reservation. The operations of 1310 may be performed in accordance with examples as disclosed herein. In some examples, aspects of the operations of 1310 may be performed by a sidelink communications manager 830 as described with reference to FIG. 8.

The following provides an overview of aspects of the present disclosure:

Aspect 1: A method for wireless communication at a first UE, comprising: transmitting, to a second UE and within an active duration of a first sidelink DRX pattern of the second UE, SCI indicating a resource reservation for a sidelink resource of a sidelink channel within at least a portion of an inactive duration of the first sidelink DRX pattern; and communicating, with the second UE via the sidelink channel, a sidelink message within the sidelink resource indicated in the resource reservation.

Aspect 2: The method of aspect 1, wherein transmitting the SCI comprises: transmitting the SCI indicating the resource reservation based at least in part on a resource availability within the active duration of the first sidelink DRX pattern.

Aspect 3: The method of aspect 2, wherein transmitting the SCI comprises: transmitting the SCI indicating the resource reservation based at least in part on the resource availability failing to satisfy a threshold resource availability.

Aspect 4: The method of any of aspects 2 through 3, wherein transmitting the SCI comprises: transmitting the SCI indicating the resource reservation based at least in part on the resource availability failing to satisfy a second threshold resource availability that is adjusted relative to a first threshold resource availability.

Aspect 5: The method of any of aspects 2 through 4, wherein transmitting the SCI comprises: transmitting the SCI indicating the resource reservation based at least in part on the resource availability corresponding to a first priority associated with the sidelink message.

Aspect 6: The method of any of aspects 2 through 5, further comprising: receiving, from an additional UE, additional SCI indicating an additional resource reservation for an additional sidelink resource of the sidelink channel within the active duration of the first sidelink DRX pattern; determining a RSRP value associated with reception of the additional SCI; and comparing the RSRP value to a RSRP threshold, wherein determining the resource availability of the sidelink channel within the active duration is based at least in part on the comparison.

Aspect 7: The method of aspect 6, wherein the RSRP threshold is based at least in part on a first priority associated with the sidelink message, an additional priority associated with an additional sidelink message scheduled within the additional sidelink resource, or both.

Aspect 8: The method of any of aspects 1 through 7, further comprising: receiving a feedback message from the second UE in response to the SCI and based at least in part on the sidelink resource being positioned within at least the portion of the inactive duration, wherein communicating the sidelink message is based at least in part on receiving the feedback message.

Aspect 9: The method of aspect 8, wherein receiving the feedback message further comprises: receiving the feedback message via a sidelink feedback channel.

Aspect 10: The method of any of aspects 1 through 9, wherein the first UE is configured to remain in an active state.

Aspect 11: The method of any of aspects 1 through 10, wherein the resource reservation occurs within an active duration of a second sidelink DRX pattern of the first UE.

Aspect 12: The method of aspect 11, wherein the active duration of the second sidelink DRX pattern is longer than the active duration of the first sidelink DRX pattern.

Aspect 13: The method of any of aspects 1 through 12, wherein transmitting the SCI comprises: transmitting the SCI indicating the resource reservation based at least in part on determining that a periodic sidelink transmission is not configured within a resource pool allocated for the sidelink channel.

Aspect 14: The method of aspect 13, wherein an active duration of second DRX pattern of the first UE is aligned in the time domain with the active duration of the first sidelink DRX pattern.

Aspect 15: The method of any of aspects 1 through 14, wherein the sidelink message comprises a periodic sidelink message, an aperiodic sidelink message, or both.

Aspect 16: The method of any of aspects 1 through 15, further comprising: receiving an indication of the first sidelink DRX pattern of the second UE from the second UE, a base station, or both.

Aspect 17: A method for wireless communication at a second UE, comprising: receiving, from a first UE and within an active duration of a first sidelink DRX pattern of the second UE, SCI indicating a resource reservation for a sidelink resource of a sidelink channel within at least a portion of an inactive duration of the first sidelink DRX pattern; and communicating, with the first UE via the sidelink channel, a sidelink message within the sidelink resource indicated in the resource reservation.

Aspect 18: The method of aspect 17, wherein receiving the SCI comprises: receiving the SCI indicating the resource reservation based at least in part on a resource availability within the active duration of the first sidelink DRX pattern.

Aspect 19: The method of aspect 18, wherein receiving the SCI comprises: receiving the SCI indicating the resource reservation based at least in part on the resource availability failing to satisfy a threshold resource availability.

Aspect 20: The method of any of aspects 18 through 19, wherein receiving the SCI comprises: receiving the SCI indicating the resource reservation based at least in part on the resource availability failing to satisfy a second threshold resource availability that is adjusted relative to a first threshold resource availability.

Aspect 21: The method of any of aspects 18 through 20, wherein receiving the SCI comprises: receiving the SCI indicating the resource reservation based at least in part on the resource availability corresponding to a first priority associated with the sidelink message.

Aspect 22: The method of any of aspects 17 through 21, further comprising: transmitting a feedback message to the first UE in response to the SCI and based at least in part on the sidelink resource being positioned within at least the portion of the inactive duration, wherein communicating the sidelink message is based at least in part on transmitting the feedback message.

Aspect 23: The method of aspect 22, wherein transmitting the feedback message further comprises: transmitting the feedback message via a sidelink feedback channel.

Aspect 24: The method of any of aspects 17 through 23, wherein the first UE is configured to remain in an active state.

Aspect 25: The method of any of aspects 17 through 24, wherein the resource reservation occurs within an active duration of a second sidelink DRX pattern of the first UE.

Aspect 26: The method of aspect 25, wherein the active duration of the second sidelink DRX pattern is longer than the active duration of the first sidelink DRX pattern.

Aspect 27: The method of any of aspects 17 through 26, wherein receiving the SCI comprises: receiving the SCI indicating the resource reservation based at least in part on a resource pool allocated for the sidelink channel not being configured for a periodic sidelink transmission.

Aspect 28: The method of any of aspects 17 through 27, further comprising: initiating an inactivity timer based at least in part on receiving the SCI indicating the resource reservation; and extending the active duration of the first sidelink DRX pattern based at least in part on the inactivity timer, wherein communicating the sidelink message is based at least in part on extending the active duration of the first sidelink DRX pattern.

Aspect 29: An apparatus for wireless communication at a first UE, comprising a processor; memory coupled with the processor; and instructions stored in the memory and executable by the processor to cause the apparatus to perform a method of any of aspects 1 through 16.

Aspect 30: An apparatus for wireless communication at a first UE, comprising at least one means for performing a method of any of aspects 1 through 16.

Aspect 31: A non-transitory computer-readable medium storing code for wireless communication at a first UE, the code comprising instructions executable by a processor to perform a method of any of aspects 1 through 16.

Aspect 32: An apparatus for wireless communication at a second UE, comprising a processor; memory coupled with the processor; and instructions stored in the memory and executable by the processor to cause the apparatus to perform a method of any of aspects 17 through 28.

Aspect 33: An apparatus for wireless communication at a second UE, comprising at least one means for performing a method of any of aspects 17 through 28.

Aspect 34: A non-transitory computer-readable medium storing code for wireless communication at a second UE, the code comprising instructions executable by a processor to perform a method of any of aspects 17 through 28.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a first user equipment (UE), comprising:
   transmitting, to a second UE and within an active duration of a first sidelink discontinuous reception pattern of the second UE, sidelink control information indicating a resource reservation for a sidelink resource of a sidelink channel within at least a portion of an inactive duration of the first sidelink discontinuous reception pattern, wherein transmitting the sidelink control information indicating the resource reservation of the sidelink resource within the inactive duration is based at least in part on a resource availability within the active duration failing to satisfy a threshold resource availability; and
   communicating, with the second UE via the sidelink channel, a sidelink message within the sidelink resource of the sidelink channel within at least the portion of the inactive duration indicated in the resource reservation.

2. The method of claim 1, further comprising:
   identifying a second resource reservation indicated by an additional UE for a second sidelink resource within a second portion of the inactive duration, wherein transmitting the sidelink control information indicating the resource reservation for the sidelink resource within the portion of the inactive duration is based at least in part on identifying the second resource reservation for the second sidelink resource within the second portion of the inactive duration.

3. The method of claim 1, further comprising:
   identifying an absence of additional resource reservations indicated by additional UEs for sidelink resources within the portion of the inactive duration, wherein transmitting the sidelink control information indicating the resource reservation within the portion of the inactive duration is based at least in part on the absence of additional resource reservations for sidelink resources within the portion of the inactive duration.

4. The method of claim 1, wherein transmitting the sidelink control information comprises:
   transmitting the sidelink control information indicating the resource reservation based at least in part on the resource availability failing to satisfy a second threshold resource availability that is adjusted relative to a first threshold resource availability.

5. The method of claim 1, wherein transmitting the sidelink control information comprises:
   transmitting the sidelink control information indicating the resource reservation based at least in part on the resource availability corresponding to a first priority associated with the sidelink message.

6. The method of claim 1, further comprising:
   receiving a feedback message from the second UE in response to the sidelink control information and based at least in part on the sidelink resource being positioned within at least the portion of the inactive duration, wherein communicating the sidelink message within the sidelink resource of the sidelink channel within at least the portion of the inactive duration is based at least in part on receiving the feedback message.

7. The method of claim 6, wherein the feedback message is received via a sidelink feedback channel, and wherein the feedback message comprises an indication that the second UE will adjust the first sidelink discontinuous reception pattern to communicate the sidelink message within the inactive duration, wherein communicating the sidelink message within the inactive duration is based at least in part on the indication.

8. The method of claim 1, wherein the first UE is configured to remain in an active state.

9. The method of claim 1, wherein the resource reservation occurs within an active duration of a second sidelink discontinuous reception pattern of the first UE.

10. The method of claim 9, wherein the active duration of the second sidelink discontinuous reception pattern is longer than the active duration of the first sidelink discontinuous reception pattern.

11. The method of claim 1, further comprising:
    determining an absence of periodic sidelink transmissions scheduled to be performed within the inactive duration, wherein transmitting the sidelink control information indicating the resource reservation within the inactive duration is based at least in part on the absence of periodic sidelink transmissions scheduled within the inactive duration.

12. The method of claim 1, wherein an active duration of second discontinuous reception pattern of the first UE is aligned in a time domain with the active duration of the first sidelink discontinuous reception pattern.

13. The method of claim 1, wherein the sidelink message comprises a periodic sidelink message, an aperiodic sidelink message, or both.

14. The method of claim 1, further comprising:
    receiving an indication of the first sidelink discontinuous reception pattern of the second UE from the second UE, a network entity, or both.

15. A method for wireless communication at a second user equipment (UE), comprising:
    receiving, from a first UE and within an active duration of a first sidelink discontinuous reception pattern of the second UE, sidelink control information indicating a resource reservation for a sidelink resource of a sidelink channel within at least a portion of an inactive duration of the first sidelink discontinuous reception pattern, wherein receiving the sidelink control information indicating the resource reservation of the sidelink resource within the inactive duration is based at least in part on a resource availability within the active duration failing to satisfy a threshold resource availability; and communicating, with the first UE via the sidelink channel, a sidelink message within the sidelink resource of the sidelink channel within at least the portion of the inactive duration indicated in the resource reservation.

16. The method of claim 15, wherein sidelink control information indicates the resource reservation for the sidelink resource within the portion of the inactive duration based at least in part on a second resource reservation indicated by an additional UE reserving a second sidelink resource within a second portion of the inactive duration.

17. The method of claim 15, wherein the sidelink control information indicates the resource reservation for the sidelink resource within the portion of the inactive duration based at least in part on an absence of additional resource reservations indicated by additional UEs reserving sidelink resources within the portion of the inactive duration.

18. The method of claim 15, wherein receiving the sidelink control information comprises:
receiving the sidelink control information indicating the resource reservation based at least in part on the resource availability failing to satisfy a second threshold resource availability that is adjusted relative to a first threshold resource availability.

19. The method of claim 15, wherein receiving the sidelink control information comprises:
receiving the sidelink control information indicating the resource reservation based at least in part on the resource availability corresponding to a first priority associated with the sidelink message.

20. The method of claim 15, further comprising:
transmitting a feedback message to the first UE in response to the sidelink control information and based at least in part on the sidelink resource being positioned within at least the portion of the inactive duration, wherein communicating the sidelink message within the sidelink resource of the sidelink channel within at least the portion of the inactive duration is based at least in part on transmitting the feedback message.

21. The method of claim 20, wherein the feedback message is received via a sidelink feedback channel, and wherein the feedback message comprises an indication that the second UE will adjust the first sidelink discontinuous reception pattern to communicate the sidelink message within the inactive duration, wherein communicating the sidelink message within the inactive duration is based at least in part on the indication.

22. The method of claim 15, wherein the first UE is configured to remain in an active state.

23. The method of claim 15, wherein the resource reservation occurs within an active duration of a second sidelink discontinuous reception pattern of the first UE.

24. The method of claim 23, wherein the active duration of the second sidelink discontinuous reception pattern is longer than the active duration of the first sidelink discontinuous reception pattern.

25. The method of claim 15, wherein the sidelink control information indicates the resource reservation for the sidelink resource within the portion of the inactive duration based at least in part on an absence of periodic sidelink transmissions scheduled to be performed within the inactive duration.

26. The method of claim 15, further comprising:
initiating an inactivity timer based at least in part on receiving the sidelink control information indicating the resource reservation; and extending the active duration of the first sidelink discontinuous reception pattern based at least in part on the inactivity timer, wherein communicating the sidelink message is based at least in part on extending the active duration of the first sidelink discontinuous reception pattern.

27. An apparatus for wireless communication at a first user equipment (UE), comprising:
at least one processor;
at least one memory coupled with the at least one processor; and
instructions stored in the at least one memory and executable by the at least one processor to cause the apparatus to:
transmit, to a second UE and within an active duration of a first sidelink discontinuous reception pattern of the second UE, sidelink control information indicating a resource reservation for a sidelink resource of a sidelink channel within at least a portion of an inactive duration of the first sidelink discontinuous reception pattern, wherein transmission of the sidelink control information indicating the resource reservation of the sidelink resource within the inactive duration is based at least in part on a resource availability within the active duration failing to satisfy a threshold resource availability; and
communicate, with the second UE via the sidelink channel, a sidelink message within the sidelink resource of the sidelink channel within at least the portion of the inactive duration indicated in the resource reservation.

28. The apparatus of claim 27, wherein the instructions are further executable by the at least one processor to cause the apparatus to:
identify a second resource reservation indicated by an additional UE for a second sidelink resource within a second portion of the inactive duration, wherein transmission of the sidelink control information indicating the resource reservation for the sidelink resource within the portion of the inactive duration is based at least in part on identification of the second resource reservation for the second sidelink resource within the second portion of the inactive duration.

29. The apparatus of claim 28, wherein the instructions are further executable by the at least one processor to cause the apparatus to:
identify an absence of additional resource reservations indicated by additional UEs for sidelink resources within the portion of the inactive duration, wherein transmission of the sidelink control information indicating the resource reservation within the portion of the inactive duration is based at least in part on the absence of additional resource reservations for sidelink resources within the portion of the inactive duration.

30. An apparatus for wireless communication at a second user equipment (UE), comprising:
at least one processor;
at least one memory coupled with the at least one processor; and
instructions stored in the at least one memory and executable by the at least one processor to cause the apparatus to:
receive, from a first UE and within an active duration of a first sidelink discontinuous reception pattern of the second UE, sidelink control information indicating a resource reservation for a sidelink resource of a sidelink channel within at least a portion of an inactive duration of the first sidelink discontinuous reception pattern, wherein reception of the sidelink control information indicating the resource reservation of the sidelink resource within the inactive duration is based at least in part on a resource availability within the active duration failing to satisfy a threshold resource availability; and
communicate, with the first UE via the sidelink channel, a sidelink message within the sidelink resource of the sidelink channel within at least the portion of the inactive duration indicated in the resource reservation.

* * * * *